United States Patent
Ikeoh et al.

(10) Patent No.: US 11,808,855 B2
(45) Date of Patent: Nov. 7, 2023

(54) OPTICAL DEVICE, RANGE SENSOR USING OPTICAL DEVICE, AND MOBILE OBJECT

(71) Applicant: RICOH COMPANY, LTD., Tokyo (JP)

(72) Inventors: Toshiyuki Ikeoh, Duesseldorf (DE); Yasufumi Yamada, Osaka (JP); Atsushi Sakai, Tokyo (JP); Naoto Jikutani, Miyagi (JP); Tsuyoshi Ueno, Kanagawa (JP); Nobunari Tsukamoto, Osaka (JP); Tadashi Nakamura, Kanagawa (JP); Kazuma Izumiya, Miyagi (JP); Shuichi Suzuki, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 499 days.

(21) Appl. No.: 16/772,897

(22) PCT Filed: Feb. 1, 2019

(86) PCT No.: PCT/JP2019/003638
§ 371 (c)(1),
(2) Date: Jun. 15, 2020

(87) PCT Pub. No.: WO2019/176360
PCT Pub. Date: Sep. 19, 2019

(65) Prior Publication Data
US 2021/0165101 A1    Jun. 3, 2021

(30) Foreign Application Priority Data
Mar. 12, 2018   (JP) ................................ 2018-044805

(51) Int. Cl.
*G01S 17/89*    (2020.01)
*G01S 17/894*   (2020.01)
(Continued)

(52) U.S. Cl.
CPC ............ *G01S 17/89* (2013.01); *G01S 7/4817* (2013.01); *G01S 17/42* (2013.01); *G01S 17/894* (2020.01); *G02B 26/105* (2013.01)

(58) Field of Classification Search
CPC ...... G01S 17/89; G01S 17/894; G01S 7/4817; G01S 17/42; G02B 26/105
See application file for complete search history.

(56) References Cited

U.S. PATENT DOCUMENTS 5,214,538 A    5/1993  Lobb
8,213,022 B1   7/2012  Rizza et al.
(Continued)

FOREIGN PATENT DOCUMENTS

JP    H03-168606       7/1991
JP    2002-026452 A    1/2002
(Continued)

OTHER PUBLICATIONS

Japanese Office Action dated Oct. 26, 2021 in Japanese Application No. 2018-044805, with English translation, 5 pages.
(Continued)

*Primary Examiner* — Behrang Badii
*Assistant Examiner* — Jay Khandpur
(74) *Attorney, Agent, or Firm* — Grüneberg and Myers PLLC

(57) ABSTRACT

An optical device includes a light source provided with a plurality of surface-emitting laser elements to emit a laser beam, a scanner to scan the laser beam emitted from the light source, and an optical system disposed in an optical path between the light source and the scanner and to guide the laser beam to the scanner. The optical system includes a first optical element to control a divergence angle of the laser beam emitted from the light source and a second optical element to concentrate the laser beam that has passed
(Continued)

through the first optical element onto a to-be-scanned surface of the scanner.

19 Claims, 33 Drawing Sheets

(51) Int. Cl.
  *G01S 7/481* (2006.01)
  *G01S 17/42* (2006.01)
  *G02B 26/10* (2006.01)

(56) References Cited

U.S. PATENT DOCUMENTS

| | | | |
|---|---|---|---|
| 2007/0024977 A1 | 2/2007 | Kawamura et al. | |
| 2007/0071056 A1* | 3/2007 | Chen | G01S 17/42 |
| | | | 372/50.124 |
| 2007/0247690 A1 | 10/2007 | Baik | |
| 2010/0177253 A1 | 7/2010 | Golub | |
| 2013/0120734 A1 | 5/2013 | Ogata et al. | |
| 2013/0229645 A1 | 9/2013 | Suzuki et al. | |
| 2013/0323469 A1* | 12/2013 | Abramov | B23K 26/364 |
| | | | 428/155 |
| 2014/0009747 A1 | 1/2014 | Suzuki et al. | |
| 2014/0034817 A1 | 2/2014 | Tadashi et al. | |
| 2014/0036071 A1 | 2/2014 | Tadashi et al. | |
| 2014/0071428 A1 | 3/2014 | Suzuki et al. | |
| 2014/0209793 A1 | 7/2014 | Nakamura et al. | |
| 2014/0358418 A1 | 12/2014 | Nakajima et al. | |
| 2015/0029487 A1 | 1/2015 | Nakajima et al. | |
| 2015/0124238 A1 | 5/2015 | Sakai et al. | |
| 2015/0160341 A1 | 6/2015 | Akatsu et al. | |
| 2015/0219803 A1 | 8/2015 | Inamoto et al. | |
| 2015/0268332 A1 | 9/2015 | Nakamura | |
| 2015/0331108 A1 | 11/2015 | Itami et al. | |
| 2016/0061955 A1 | 3/2016 | Imai et al. | |
| 2016/0097843 A1 | 4/2016 | Nakamura | |
| 2016/0167514 A1* | 6/2016 | Nishizaki | B60K 35/00 |
| | | | 345/7 |
| 2016/0261090 A1 | 9/2016 | Sakai et al. | |
| 2016/0299219 A1 | 10/2016 | Suzuki et al. | |
| 2016/0349371 A1 | 12/2016 | Suzuki et al. | |
| 2017/0082747 A1 | 3/2017 | Akatsu et al. | |
| 2017/0123063 A1 | 5/2017 | Yamashita et al. | |
| 2017/0168261 A1 | 6/2017 | Itami et al. | |
| 2017/0180688 A1* | 6/2017 | Otsubo | G02B 26/105 |
| 2017/0273161 A1 | 9/2017 | Nakamura | |
| 2017/0307736 A1 | 10/2017 | Donovan | |
| 2018/0006432 A1* | 1/2018 | Kondo | H01S 5/042 |
| 2018/0038959 A1 | 2/2018 | Akatsu et al. | |
| 2018/0062345 A1 | 3/2018 | Bills et al. | |
| 2018/0284270 A1 | 10/2018 | Sakai et al. | |
| 2018/0329037 A1* | 11/2018 | Bozchalooi | G01S 7/4815 |
| 2019/0033429 A1* | 1/2019 | Donovan | G01S 17/06 |
| 2019/0120941 A1* | 4/2019 | Qiu | G01S 7/4815 |
| 2021/0072398 A1* | 3/2021 | Matsunaga | G01S 17/93 |
| 2021/0157008 A1* | 5/2021 | Schwarz | G01S 7/4817 |

FOREIGN PATENT DOCUMENTS

| | | |
|---|---|---|
| JP | 2006-251688 A | 9/2006 |
| JP | 2007-058163 | 3/2007 |
| JP | 2007-293226 | 11/2007 |
| JP | 2010-151958 A | 7/2010 |
| JP | 2014-029317 A | 2/2014 |
| JP | 2015-111090 | 6/2015 |
| JP | 2015-129734 A | 7/2015 |
| JP | 2017-017296 A | 1/2017 |
| WO | 2016/207327 | 12/2016 |

OTHER PUBLICATIONS

International Search Report and Written Opinion dated Apr. 16, 2019 in PCT/JP2019/003638 filed on Feb. 1, 2019.
Japanese Office Action dated Apr. 18, 2023, in Japanese Application No. 2022-109642, 2 pages.
Chinese Office Action dated Aug. 31, 2023, in Chinese Application No. 201980018066.4, 12 pages.

* cited by examiner

DISTRIBUTION AT BEAM-WAIST POSITION WHEN
LASER BEAM IS INCIDENT ON NEIGHBORING MLA

INTENSITY DISTRIBUTION WHEN BEAM IS DISPERSED

FOCAL LENGTH OF MLA>SPACING BETWEEN VCSEL AND MLA

OPTICAL DEVICE, RANGE SENSOR USING OPTICAL DEVICE, AND MOBILE OBJECT

TECHNICAL FIELD

Embodiments of the present disclosure relate to an optical device that scans a laser beam, a range sensor provided with the optical device, and a mobile object.

BACKGROUND ART

In the operations of a mobile object such as a vehicle, a ship, and an aircraft, technologies to detect the position of an object in a wide range of angle are used. As one example of such sensing technologies, light detection and ranging (LiDAR) is known in the art. The LiDAR is remote sensing based on light, and uses time-of-flight (TOF) method in which the distance to the object is measured based on the length of time it takes while the laser beams that are emitted from the laser beam source are reflected by an object and then return to the sensor. The laser beams are scanned in a wide angle by a scanner such as a micro-electromechanical systems (MEMS) mirror and a polygon mirror. As known in the art, edge-emitting semiconductor laser that emits laser beams parallel to the substrate is used as a LiDAR laser beam source. As it is difficult to integrate such edge-emitting semiconductor laser, the use of a vertical-cavity surface-emitting laser (VCSEL) device as a light source is under study as the multiple light emitting elements of the VCSEL device can easily be integrated into the same substrate. The VCSEL device performs lasing in a direction perpendicular to the substrate. A configuration in which the laser beams that are emitted from a plurality of light-emitting points are focused on the surface of a movable mirror using a VCSEL array and are optically scanned by the movable mirror is known in the art (see, for example, PTL 1).

CITATION LIST

Patent Literature

PTL 1: Japanese Patent Application Publication No. 2010-151958

SUMMARY OF INVENTION

Technical Problem

In the known optical scanners, laser beams are scanned as the light emitted from the VCSEL device is directly focused on a movable mirror by an optical element such as a focus lens. Since the output power of each light emitting element is small, the output power of the VCSEL device is increased by two-dimensional integration of the light emitting elements.

In the LiDAR devices, the laser beams that are emitted from the laser beam source need to be scanned at a high angular resolution in order to achieve a sufficient measuring resolution and measurable distance. The angular resolution $d\theta$ of the scanning laser beam is expressed in $d\theta = 2 \times \tan^{-1}[(a/2)/f]$, using the size a of the light-emitting area of the laser beam source and the focal length f of the focus lens that concentrates the laser beams onto a movable mirror.

In order to increase the angular resolution (or decrease $d\theta$), the size a of the light-emitting area of the VCSEL may be reduced, or the focal length f of the focus lens may be increased. In actuality, there is a limit to the extent to which the size of the light-emitting area a can be reduced, so that the focal length f of the focus lens needs to be made longer.

The beam waist diameter W of the laser beams that are concentrated by the lens is calculated by an equation given below using the divergence angle $\varphi$ of the laser beam and the focal length f of the lens.

$$W = 2f \times \tan(\varphi/2)$$

If the focal length f of the lens is lengthened in order to achieve a high angular resolution, the beam waist diameter W becomes wider, and a movable mirror with a large mirror dimension is required. However, it is desired that the movable mirror in LiDAR system be downsized. As the minor dimension of the MEMS mirror is smaller, high-speed and wide-range scanning can be achieved. A smaller polygon mirror can perform scanning at high speed, and can make the system more compact.

LiDAR devices that perform high-speed and wide-range scanning require laser beams with a high angular resolution. However, when the focal length is long, the beam diameter cannot be stopped down. If the laser beams whose focal length is made longer for the purpose of increasing the angular resolution are focused on a downsized movable mirror, since the beam diameter is larger than dimension of the movable mirror, and some part of light cannot be incident on the movable mirror. In such cases, the radiation intensity of light for optical scanning decreases, and the detectable distance becomes shortened.

Embodiments of the present disclosure aim at achieving high-speed and wide-range optical scanning with a high angular resolution, without affecting the detection distance.

Solution to Problem

In order to deal with the above technical problems, an optical element is arranged in the optical path of each light emitting element of a VCSEL device, and it controls the divergence angle reduces the divergence angle of the laser beam emitted from the VCSEL device. Due to such a configuration, the laser beams are focused on a movable mirror with a small beam waist diameter, and a sufficient radiation intensity of incident light can be achieved.

More specifically, an optical device includes a light source provided with a plurality of surface-emitting laser elements to emit a laser beam, a scanner to scan the laser beam emitted from the light source, and an optical system disposed in an optical path between the light source and the scanner and to guide the laser beam to the scanner. The optical system includes a first optical element to control a divergence angle of the laser beam emitted from the light source and a second optical element to focus the laser beam that has passed through the first optical element onto a to-be-scanned surface of the scanner.

Advantageous Effects of Invention

Due to the above configurations, high-speed and wide-range optical scanning can be achieved with a high angular resolution, without affecting the detection distance.

BRIEF DESCRIPTION OF DRAWINGS

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

DESCRIPTION OF EMBODIMENTS

Figure 1:
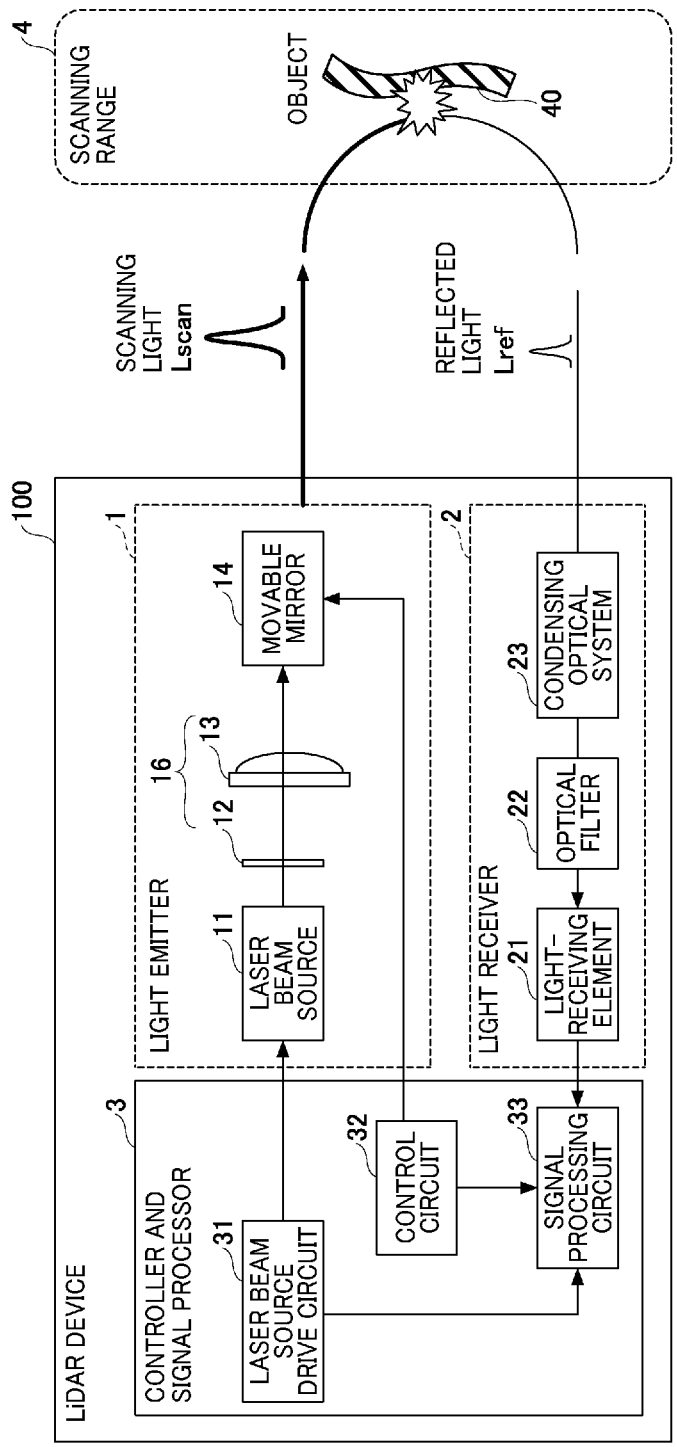
FIG. 1 is schematic diagram illustrating a light detection and ranging (LiDAR) device according to an embodiment of the present disclosure.

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

FIG. 1 is a schematic diagram illustrating a light detection and ranging (LiDAR) device 100 according to an embodiment of the present disclosure. The LiDAR device 100 is an example of a range sensor that optically measures the distance. The LiDAR device 100 includes a light emitter 1 that emits a laser beam, a light receiver 2 that receives the reflected light Lref reflected by an object 40, and a controller and signal processor 3 that controls the light emitter 1 and computes the distance based on the received reflected light. The light emitter 1 is an example of an optical device.

The light emitter 1 includes a laser beam source 11 that is an example of a light source, a movable mirror 14 that serves as a scanner, and a projection optical system 16 that is disposed on the optical path between the laser beam source 11 and the movable mirror 14. The projection optical system 16 includes a first optical element 12 that controls the divergence angle of the laser beam that is emitted from the laser beam source 11, and a second optical element 13 that converts the laser beam whose divergence angle has been controlled into a laser beam with a desired divergence angle and angular resolution. The movable mirror 14 scans a desired scanning range 4 with the laser beam that comes from the second optical element 13 and is incident on the movable mirror 14 with a prescribed angular resolution.

The light receiver 2 includes a light-receiving element 21, an optical filter 22, and a condensing optical system 23. The condensing optical system 23 focuses the reflected light Lref reflected by an object 40 on the light-receiving element 21 as passing through the optical filter 22. The optical filter 22 is a filter through which only the wavelengths near the oscillation wavelength of the laser beam source 11 can pass through. The signal-to-noise (S/N) ratio of the light that is incident on the light-receiving element 21 improves as wavelengths on both sides of the oscillation wavelength are cut. The light-receiving element 21 is one or more avalanche photodiode (APD), and converts the light that has passed through the optical filter 22 into an electrical signal.

The controller and signal processor 3 includes a laser beam source drive circuit 31 that drives the laser beam source 11, a control circuit 32 that controls the movement (or deflection angle) of the movable mirror 14, and a signal processing circuit 33 that computes the distance to the object 40. The laser beam source drive circuit 31 controls the timing of light emission and light-emission intensity of the laser beam source 11. For example, the controller and signal processor 3 is implemented by a large scale integration (LSI) chip, an integrated circuit (IC) chip such as a microprocessor, a logic device such as a field-programmable gate array (FPGA), and combined use of the IC chip and the logic device.

The light that is emitted from the laser beam source 11 is guided to the movable mirror 14 by the first optical element 12 and the second optical element 13, and the movable mirror 14 irradiates the object 40 existing in the scanning range 4 with the scanning light. The reflected light Lref that is reflected by the object 40 passes through the condensing optical system 23 and the optical filter 22, and is received by the light-receiving element 21. The light-receiving element 21 outputs photoelectric current as a detection signal, according to the radiation intensity of incident light.

The signal processing circuit 33 computes the distance to the object 40, which is calculated from the time difference between a detection signal and a light-emission timing signal supplied from the laser beam source drive circuit 31.

Figure 2:
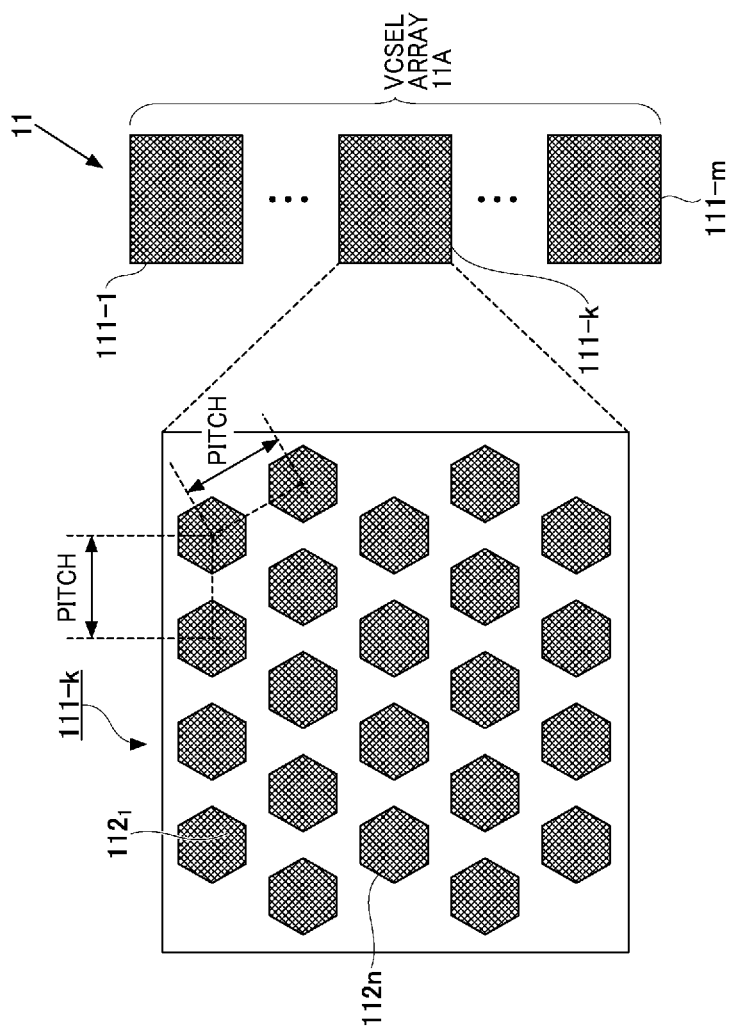
FIG. 2 is a diagram illustrating an example configuration of a laser beam source according to an embodiment of the present disclosure.

FIG. 2 is a diagram illustrating an example configuration of the laser beam source 11 according to the present embodiment. For example, the laser beam source 11 in which a plurality of laser element groups, each of which is referred to as a layer, are arranged on the same plane is composed of a vertical-cavity surface-emitting laser (VCSEL) array 11A (surface-emitting laser array). In the following description of the present disclosure, a surface-emitting laser element that forms each layer of the laser beam source 11 may be referred to simply as a light emitting element. The VCSEL array 11A includes layers 111-1 to 111-$m$ (that may collectively be referred to as the layers 111 in the following description), and each of the layers 111 is provided with a plurality of light emitting elements 112-1 to 112-$n$ (that may collectively be referred to as the light emitting elements 112 where appropriate in the following description).

The light emitting elements 112 are elements that can be integrated into the same substrate, and the optical axis of each of the light emitting elements 112 is orthogonal to a plane on which the VCSEL array 11A is arranged.

The timing at which light is emitted from each of the layers 111 is independently controlled by the laser beam source drive circuit 31. Moreover, each of the layers 111 is controlled such that the multiple light emitting elements 112 included in that layer 111 emit light at the same time.

In FIG. 2, the multiple layers 111 are one-dimensionally arranged. However, no limitation is indicated thereby, and the VCSEL array 11A in which the multiple layers 111 are two-dimensionally arranged may be used. The light emitting elements 112 of each of the layers 111 are minutely arranged with a prescribed pitch with an arrangement of a honeycomb structure. However, no limitation is intended thereby. The shape of the opening of the light emitting elements 112 is also not limited to a hexagonal shape. For example, the number of the layers 111 of the VCSEL array 11A, the number of the light emitting elements 112 in each of the layers 111, and the dimension or size of the light-emitting area are designed as desired according to, for example, the angular resolution, the scanning range, and the detection distance that are required for the LiDAR device 100.

Figure 3A:
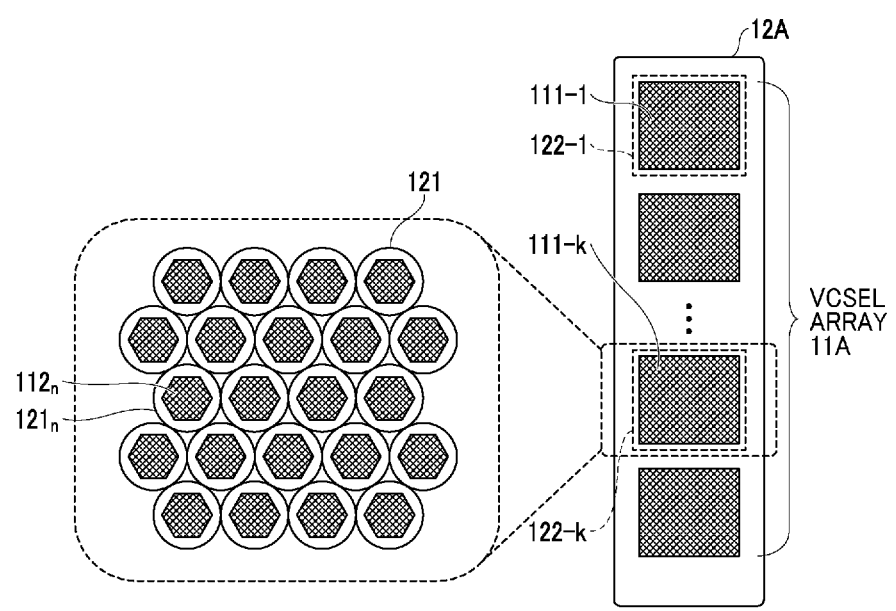
FIG. 3A and FIG. 3B are diagrams each illustrating the relative positions of a first optical element and a vertical-cavity surface-emitting laser (VCSEL) array, according to an embodiment of the present disclosure.
Figure 3B:
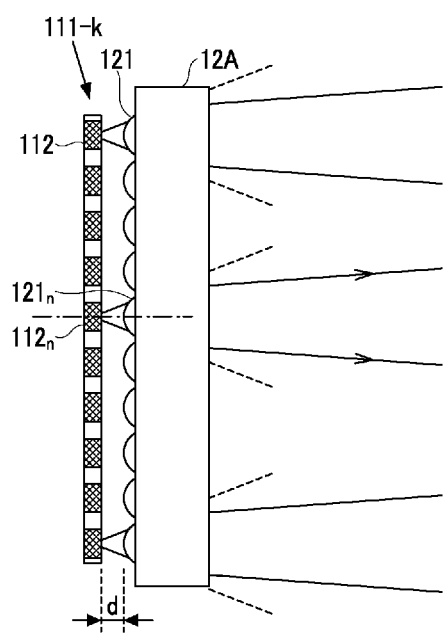

FIG. 3A and FIG. 3B are diagrams each illustrating the relative positions of the first optical element 12 and the VCSEL array 11A, according to the present embodiment. The first optical element 12 is an optical element that controls the divergence angle of the laser beam emitted from the VCSEL array 11A. Any desired optical element array that can control the divergence angle of the VCSEL array 11A, such as a microlens array (MLA) and a diffraction element array, may be adopted as the first optical element 12. In the example embodiment as illustrated in FIG. 3A and FIG. 3B, a MLA 12A is used as the first optical element 12.

FIG. 3A is a diagram illustrating the VCSEL array 11A and the MLA 12A in an overlapping manner, in the direction parallel to the optical axis, according to the present embodiment. FIG. 3B is a side view of the VCSEL array 11A and the MLA 12A, according to the present embodiment. The MLA 12A includes a plurality of lens groups 122 that correspond to the layout of the layers 111 of the VCSEL array 11A. Each of the lens groups 122 includes a plurality of lens elements 121 as many as the light emitting elements 112 of the corresponding layer 111.

Each of the lens elements 121 is arranged such that the optical axis matches the optical axis of the corresponding light emitting element 112, and uses refraction of light to control the divergence angle of the laser beam output from each of the light emitting elements 112. The lens diameter of the multiple lens elements 121 is designed such that the neighboring lens elements 121 do not interfere with each other, and the spacing between the lens elements 121 is narrower than the spacing between the light emitting elements 112 of the VCSEL array 11A.

As illustrated in FIG. 3B, the MLA 12A is arranged on the opposite side of the VCSEL array 11A such that the convex surfaces of the lens elements 121 are placed on the incident-side of the laser beams output from the VCSEL array 11A. All the lens elements 121 of the MLA 12A have the same focal length. The distance d between the VCSEL array 11A and the incident plane of the MLA 12A is designed to be equal to or shorter than the focal length of the lens elements 121 of the MLA 12A.

Figure 4:
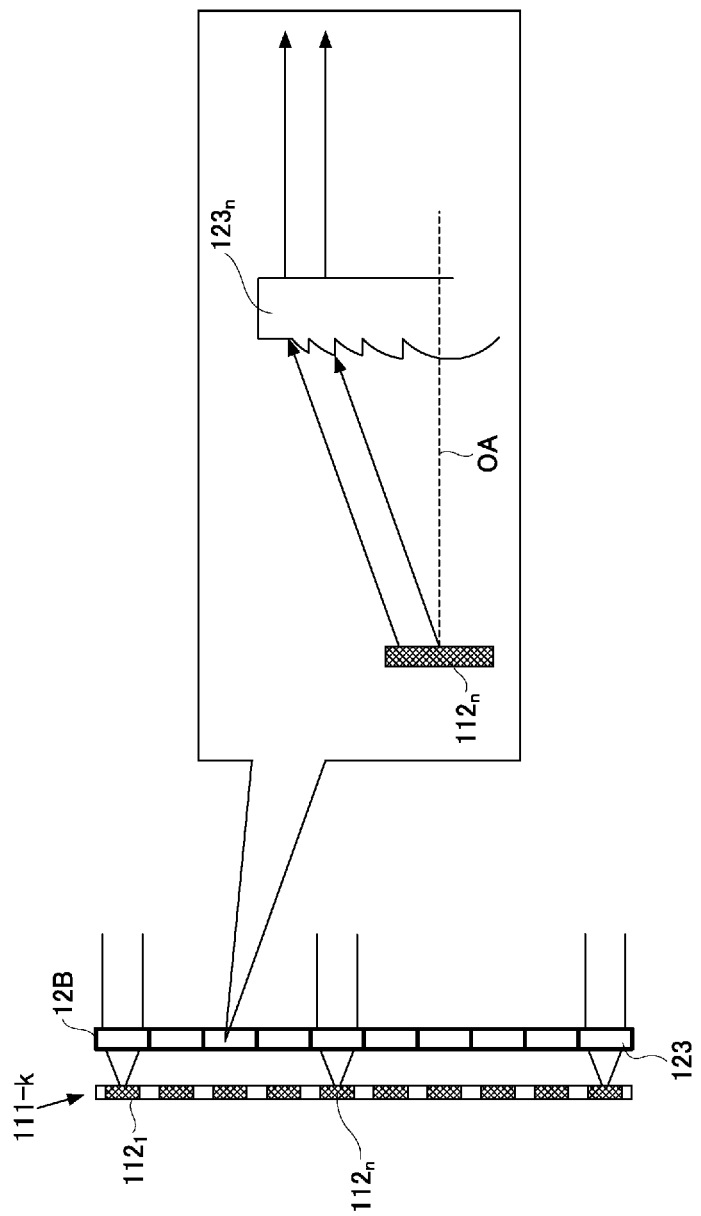
FIG. 4 is a diagram illustrating an example case in which a diffraction element array is used as a first optical element, according to an embodiment of the present disclosure.

FIG. 4 is a diagram illustrating an example case in which a diffraction element array 12B is used as the first optical element 12, according to the present embodiment. The diffraction element array 12B includes a plurality of lens groups 122 that correspond to the layout of the layers 111 of the VCSEL array 11A. Each of the lens groups 122 includes a plurality of diffraction lens 123 as many as the light emitting elements 112 of the corresponding layer 111.

The diffraction lens 123 has a concentric cyclic pattern around an optical axis OA, and controls the divergence angle of the incident light based on this cyclic pattern. Each of the diffraction lenses 123 is arranged such that the optical axis matches the optical axis of the corresponding light emitting element 112, and the lens surface of the diffraction lens 123 is placed on the incident-side of the laser beams.

Figure 5:
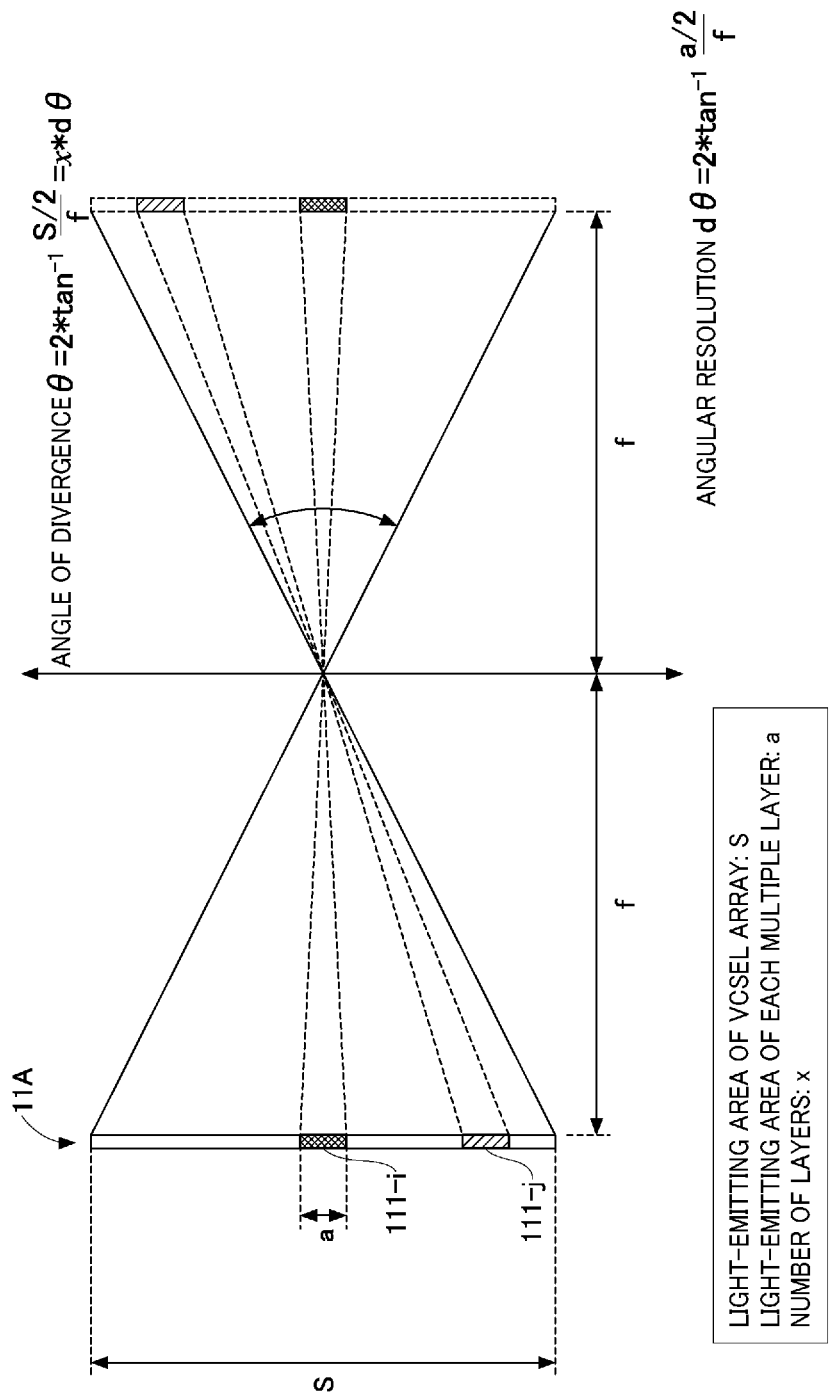
FIG. 5 is a diagram illustrating the relative positions of a second optical element and the VCSEL array, according to an embodiment of the present disclosure.

FIG. 5 is a diagram illustrating the relative positions of the second optical element 13 and the VCSEL array 11A, according to the present embodiment. The second optical element 13 is a projector lens that converts the laser beam whose divergence angle has been controlled by the MLA 12A into a laser beam with a desired angle of divergence and angular resolution.

"f" denotes the focal length of the projector lens (i.e., the second optical element 13). The VCSEL array 11A is arranged at approximately the focal point of the projector lens. The angle of divergence of the laser beam θ and the angular resolution dθ are determined by the focal length f of the projector lens, the size S of the light-emitting area of the entirety of the VCSEL array 11A, and the size a of the light-emitting area of each of the multiple layers 111, using the First Equation and Second Equation given below.

$$\theta = 2 \times \tan^{-1}[(S/2)/f] \qquad \text{First Equation}$$

$$d\theta = 2 \times \tan^{-1}[(a/2)/f] \qquad \text{Second Equation}$$

Figure 6:
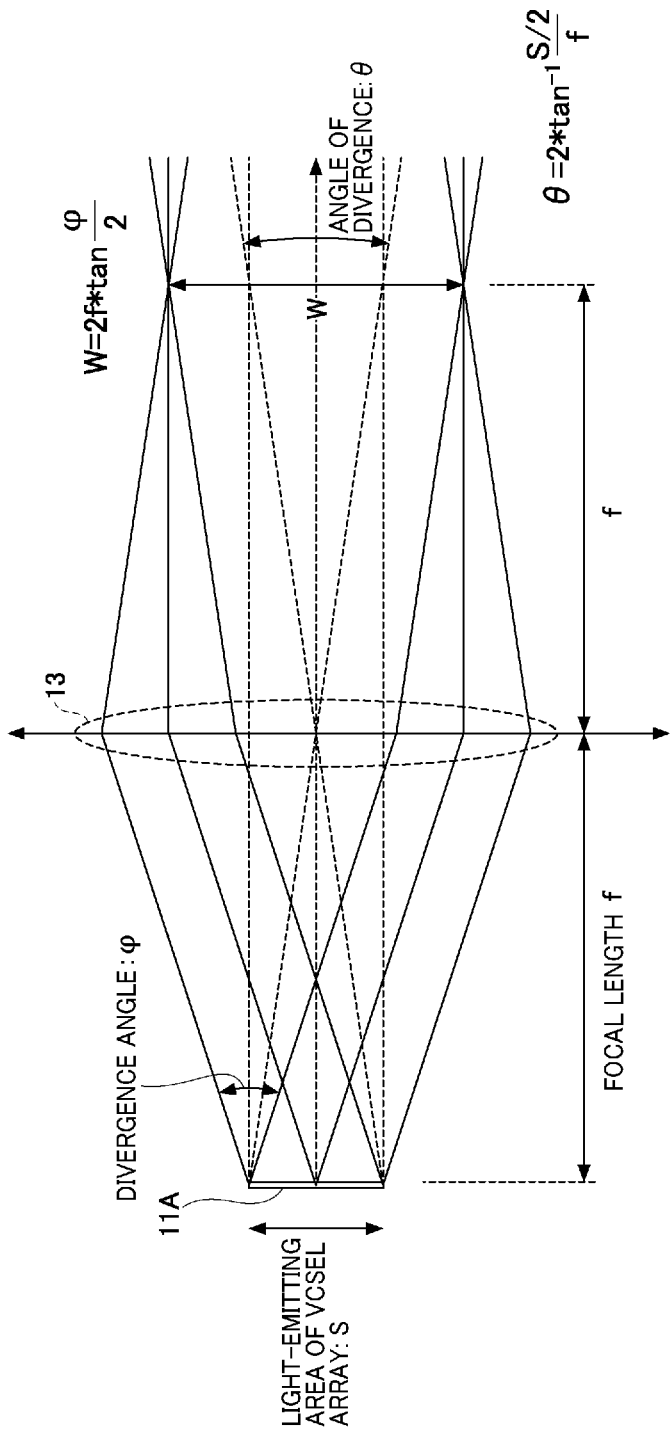
FIG. 6 is a diagram illustrating optical paths of a projection optical system, according to an embodiment of the present disclosure.

FIG. 6 is a diagram illustrating optical paths of the projection optical system 16, according to the present embodiment. The beam diameters of the laser beams that have passed through the projector lens (i.e., the second optical element 13) are minimized at the focal point of the projector lens. The point at which the beam diameter is minimized is referred to as a beam waist. The beam waist diameter W is expressed in the Third Equation using the divergence angle φ of the laser beam oscillating from the laser beam source and the focal length f of the projector lens.

$$W = 2f \times \tan^{-1}(\varphi/2) \qquad \text{Third Equation}$$

As understood from the Third Equation as above, the beam waist diameter W can be decreased by decreasing the divergence angle φ of the laser beam source, and the light can be focused on the movable mirror 14 whose area of mirror is small.

Figure 7:
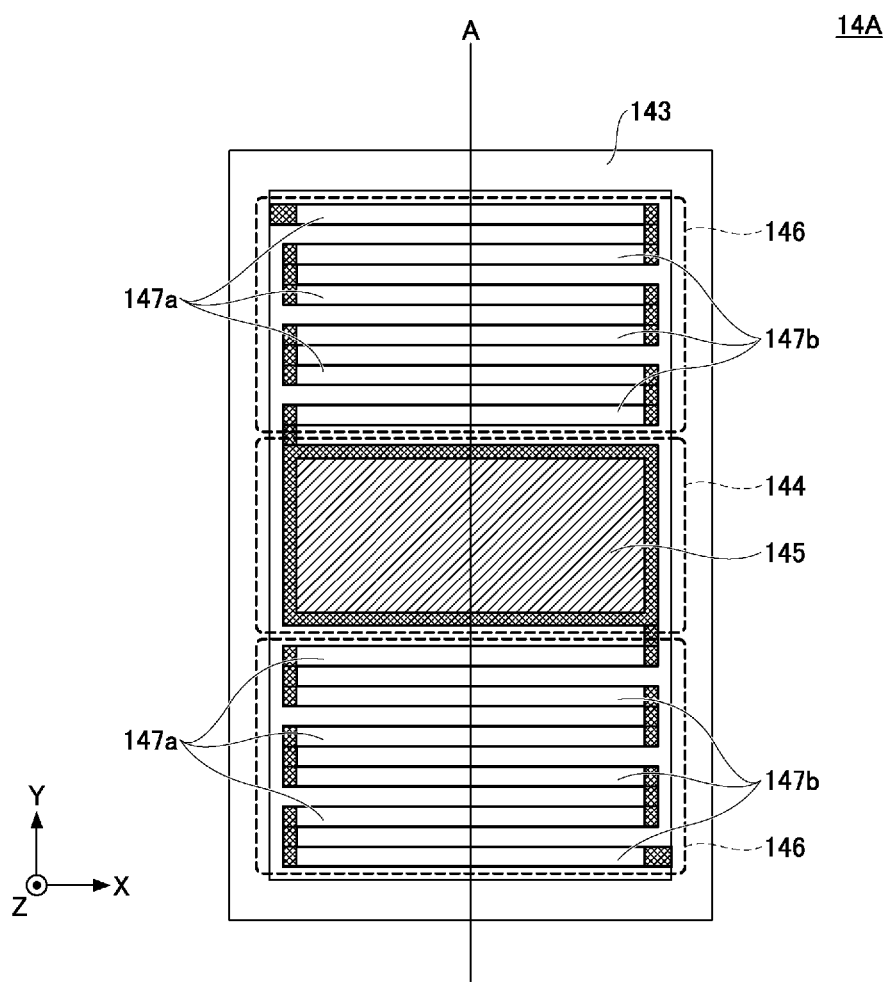
FIG. 7 a diagram illustrating a movable mirror according to an embodiment of the present disclosure.

FIG. 7 is a diagram illustrating the MEMS mirror 14A that serves as the movable mirror 14. The movable mirror 14 scans the laser beam that has passed through the projector lens (i.e., the second optical element 13) in a uniaxial or biaxial manner and irradiates the object 40 existing in the scanning range 4 with the scanned light. The MEMS mirror 14A is arranged at the beam waist position where the beam diameter of the laser beam that has passed through the second optical element 13 is minimized, i.e., approximately the focal point of the second optical element 13.

The MEMS mirror 14A includes a movable part 144 provided with a reflection mirror 145, and a pair of serpentine beams 146 that support the movable part 144 at both sides of the movable part 144. One end of each one of the serpentine beams 146 is fixed to a supporting substrate 143, and the other end of the serpentine beams 146 is coupled to the movable part 144.

In each one of the serpentine beams 146, a meandering pattern is formed as a plurality of first piezoelectric members 147a and a plurality of second piezoelectric members 147b are arranged in alternating sequence having a plurality of turning portions between each pair of the first piezoelectric member 147a and the second piezoelectric member 147b. An antiphase voltage signal is applied to a neighboring pair of the first piezoelectric member 147a and the second piezoelectric member 147b. In other words, the phase of the voltage signal that is applied to the first piezoelectric member 147a is opposite to the phase of the voltage signal applied to the second piezo-electric member 147b. As a result, the serpentine beam 146 is curved in Z-direction.

The direction of bending is opposite to each other between a neighboring pair of the first piezoelectric member 147a and the second piezoelectric member 147b. The bending in opposite directions is accumulated, and the movable part 144 provided with the reflection mirror 145 moves up and down in a rotary motion around a rotation axis A. In the example case as illustrated in FIG. 7, the reflection mirror 145 has a rectangular shape. However, no limitation is intended thereby. For example, the reflection mirror 145 of an elliptic shape or circular shape may be used.

A sinusoidal wave that has a drive frequency in view of a mirror resonant mode around the rotation axis A is applied to the first piezoelectric member 147a and the second piezoelectric member 147b in opposite phase. As a result, a wide rotation angle can be achieved with low voltage.

Figure 8:
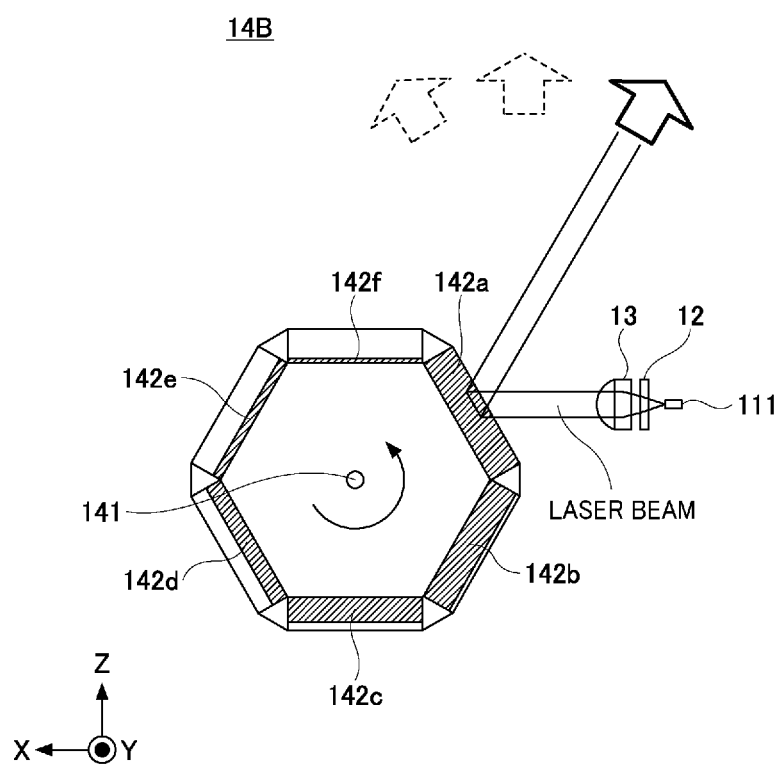
FIG. 8 is a diagram illustrating a movable mirror according to an alternative embodiment of the present disclosure.

FIG. 8 is a diagram illustrating a polygon mirror 14B that serves as another example of the movable mirror 14, according to the present embodiment. The polygon mirror 14B rotates around a rotation axis 141 at a constant velocity. In this example, plane mirrors 142a to 142f are disposed on the six inclined planes of a rotor of a hexagonal shape. As the rotor rotates on the rotation axis 141, the incident angle of a laser beam changes on the mirror surface, and the laser beam can be scanned on the XZ plane.

The hades (inclination angles) of the plane mirrors 142a to 142f with reference to the rotation axis 141 are different from each other. As a prescribed hade (inclination angle) is given to each of the plane mirrors 142a to 142f, the exit angle of a projector beam in the Y-axis direction is controlled. Every time the mirror surface where the laser beam is reflected is changed, the angle at which the laser beam is output in the Y-axis direction changes. The scanning area in the Y-axis direction can be broadened according to the number of the mirror surfaces that the polygon mirror 14B has.

First Example

Figure 9:
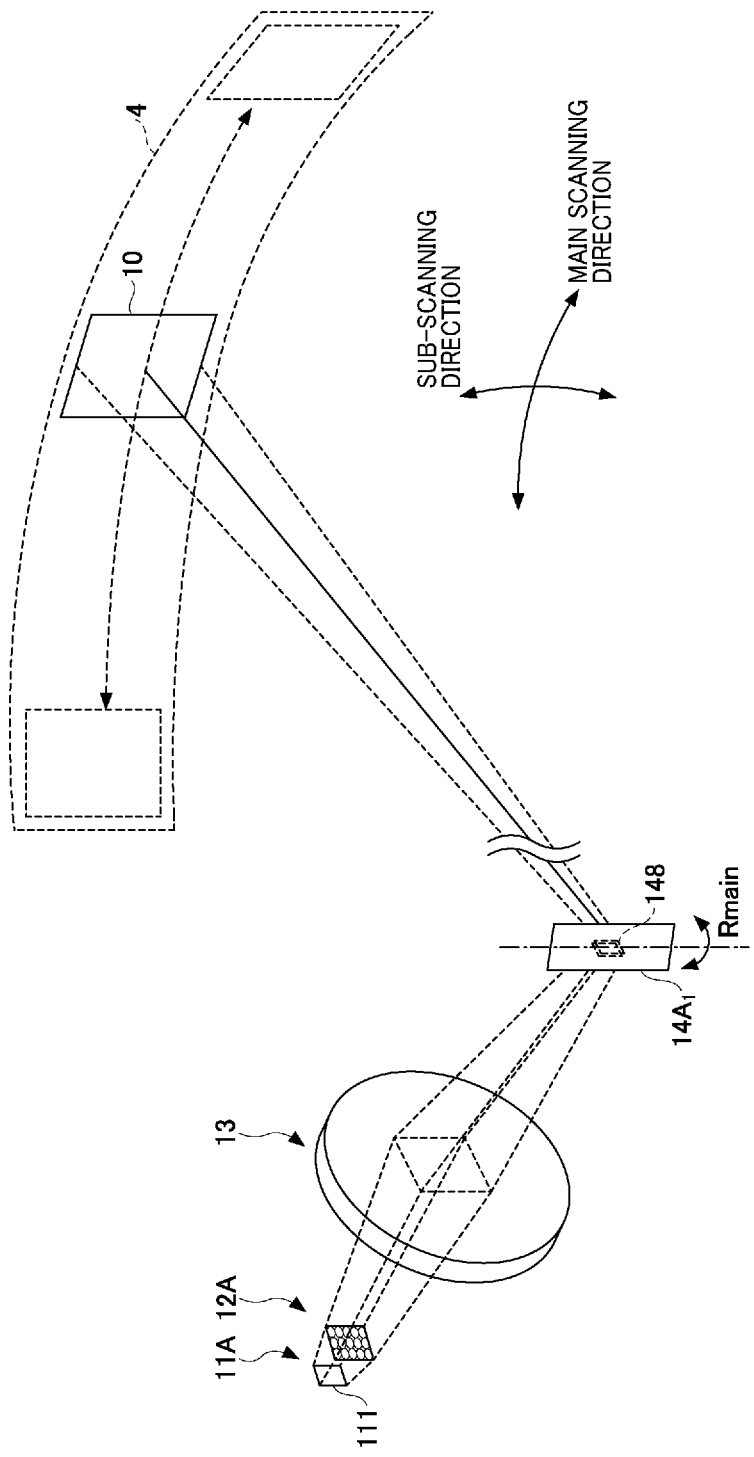
FIG. 9 is a diagram illustrating the optical scanning performed by a light emitter, according to a first example of the present disclosure.

FIG. 9 is a diagram illustrating the optical scanning performed by the light emitter 1, according to a first example. The VCSEL array 11A with one layer and the movable mirror 14 of a uniaxial-scanning type are used in the present example configuration. A uniaxial-scanning MEMS mirror 14A1 is used as a movable mirror.

The laser beam that is emitted from the VCSEL array 11A is prevented from diverging by the MLA 12A, and is incident on the projector lens (i.e., the second optical element 13). The VCSEL array 11A is arranged near the focal length f on the incident side of the second optical element 13. The MEMS mirror 14A1 is arranged near the focal length f on the light exiting side of the second optical element 13. The laser beam that has passed through the second optical element 13 is focused on the uniaxial-scanning MEMS mirror 14A1, and is cast in a direction dependent on the angle that the incident laser beam forms with the MEMS mirror 14A1.

In regard to the main scanning direction, the laser beam is scanned as the rotation angle of the MEMS mirror 14A1 is changed (see FIG. 7), and in the scanning range 4 the position of a projection image 10 sweeps in the main scanning direction. The scanning range in the main scanning direction depends on the scanning angle of the MEMS mirror 14A1. On the other hand, the scanning range in the sub-scanning direction is determined by the angle of divergence θ in the sub-scanning direction of the VCSEL array 11A. The angle of divergence θ using Equation 1 as above is determined based on the size S of the light-emitting area of the VCSEL array 11A in the sub-scanning direction, and the focal length f of the projector lens (i.e., the second optical element 13).

The angular resolution dθ of the scanning laser beam in both the main scanning direction and the sub-scanning direction is determined by the focal length f of the projector lens (i.e., the second optical element 13) and the size a of the light-emitting area of each of the multiple layers 111 of the VCSEL array 11A, based on the Second Equation as above.

There is a limit to the extent to which the size of the light-emitting area of each of the multiple layers 111 can be reduced. However, the laser beam that is emitted from the VCSEL array 11A is prevented from diverging by the MLA 12A. Accordingly, a laser beam whose beam waist has been stopped down is incident on the reflection area 148 of the MEMS mirror 14A1. Due to this configuration, the radiation intensity of light can be prevented from decreasing, and the laser beams can be scanned in a wide range while maintaining a high definition.

In place of the uniaxial-scanning MEMS mirror 14A1, any desired mirror such as a polygon mirror, where the angle of the movable mirror uniaxially changes with reference to the laser beam, may be used.

Second Example

Figure 10:
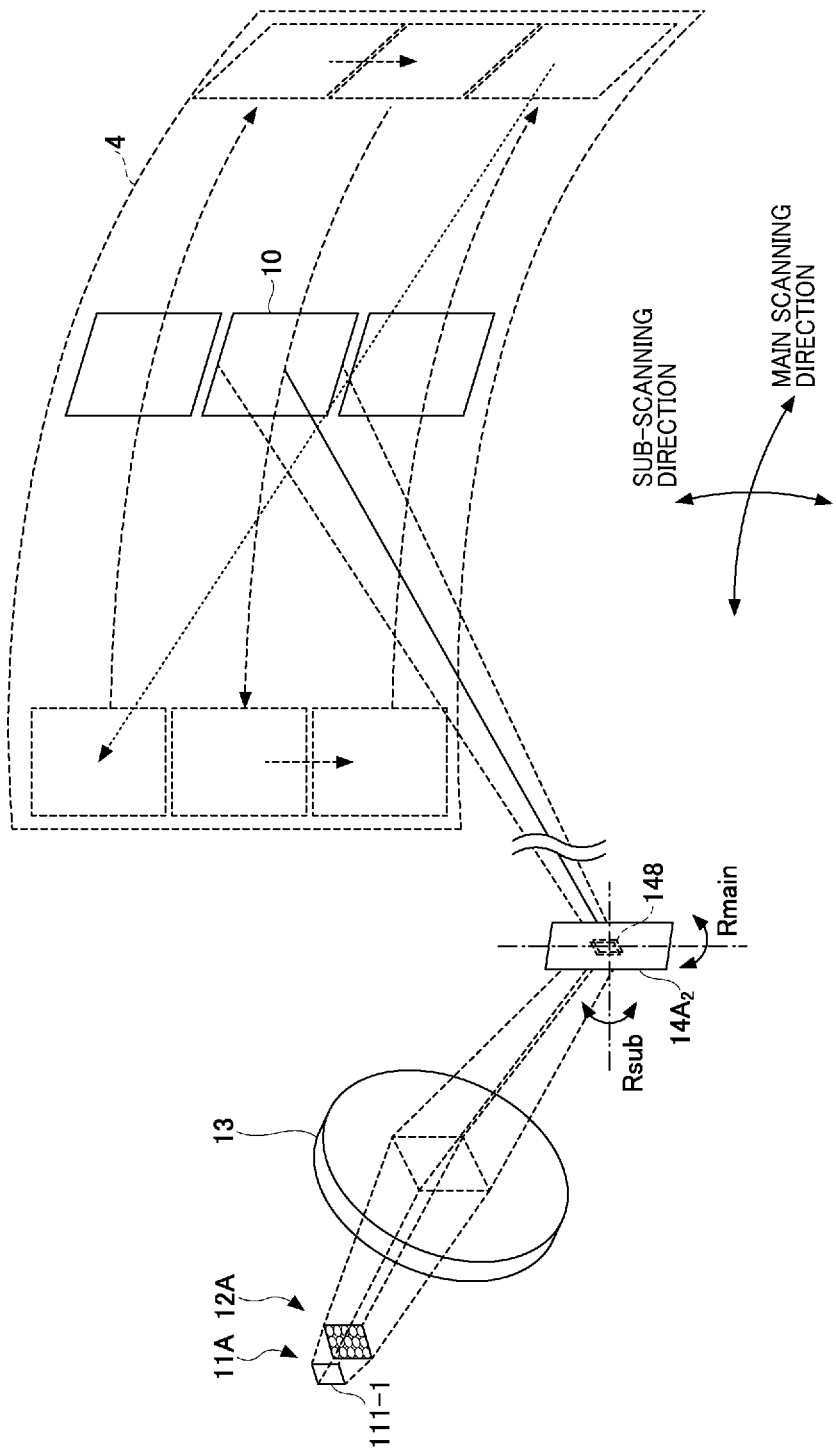
FIG. 10 is a diagram illustrating the optical scanning performed by a light emitter, according to a second example of the present disclosure.

FIG. 10 is a diagram illustrating the optical scanning performed by the light emitter 1, according to a second example of the present disclosure. More specifically, FIG. 10 illustrates an example configuration in which the VCSEL array 11A with one layer and the movable mirror 14 of a biaxial-scanning type are used. A biaxial-scanning MEMS mirror 14A2 is used as a movable mirror. As the MEMS mirror 14A2 rotates on a principal axis Rmain, the laser beams are scanned in the main scanning direction. As the MEMS mirror 14A2 rotates on a conjugate axis Rsub, the laser beams are in the sub-scanning direction.

The laser beam that is emitted from the VCSEL array 11A is prevented from diverging by the MLA 12A, and is incident on the projector lens (i.e., the second optical element 13). The VCSEL array 11A is arranged near the focal length f on the incident side of the second optical element 13. The MEMS mirror 14A2 is arranged near the focal length f on the light exiting side of the second optical element 13. The laser beam that has passed through the second optical element 13 is incident on the biaxial-scanning MEMS mirror 14A2, and is cast in a direction dependent on the angle that the incident laser beam forms with the MEMS mirror 14A2.

The MEMS mirror 14A2 changes its angle in the main scanning direction and the sub-scanning direction to scan a laser beam. Within the predetermined scanning range 4, the projection image 10 repeats a sweep in the main scanning direction and a shift in the sub-scanning direction in alternating sequence. The scanning ranges in the main scanning direction and the sub-scanning direction depends on the scanning angle of the MEMS mirror 14A2. The angular resolution dθ of the scanning laser beam in both the main scanning direction and the sub-scanning direction is determined by the focal length f of the projector lens (i.e., the second optical element 13) and the size a of the light-emitting area of each of the multiple layers 111 of the VCSEL array 11A, based on the Second Equation as above.

Also in such an example configuration as above, the laser beam that is emitted from the VCSEL array 11A is prevented from diverging by the MLA 12A. Accordingly, a laser beam whose beam waist has been stopped down is incident on the reflection area 148 of the MEMS mirror 14A2. Due to this configuration, the radiation intensity of light can be prevented from decreasing, and the laser beams can be scanned in a wide range while maintaining a high definition.

In place of the biaxial-scanning MEMS mirror 14A2, any desired mirror such as a polygon mirror, where the angle of the movable mirror biaxially changes with reference to the laser beam, may be used.

Third Example

Figure 11:
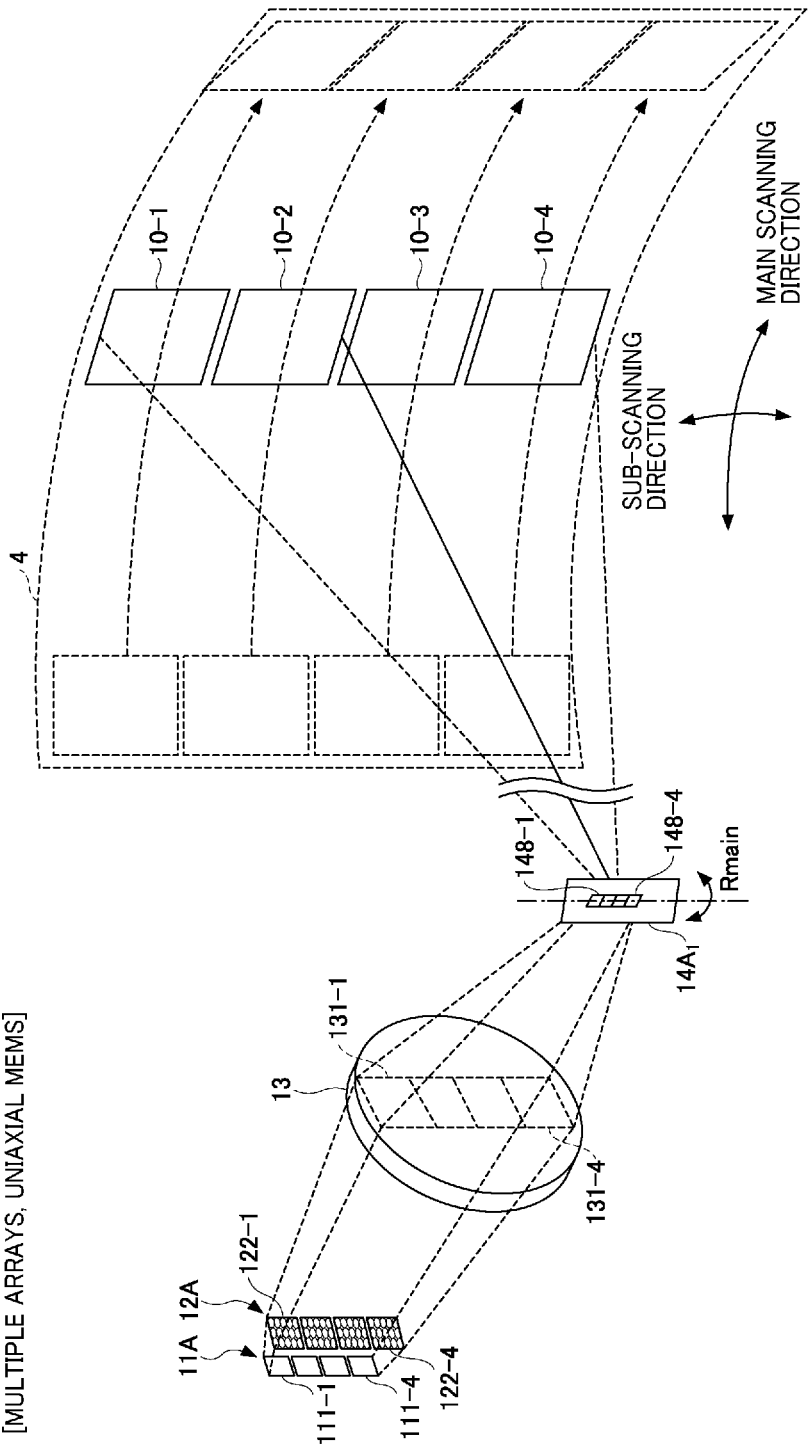
FIG. 11 is a diagram illustrating the optical scanning performed by a light emitter, according to a third example of the present disclosure.

FIG. 11 is a diagram illustrating the optical scanning performed by the light emitter 1, according to a third example of the present disclosure. In the present example, the VCSEL array 11A that include at least two layers 111 in the sub-scanning direction and a uniaxial-scanning MEMS mirror 14A1 are used.

The laser beam that is emitted from the VCSEL array 11A is prevented from diverging by the MLA 12A, and is incident on the projector lens (i.e., the second optical element 13). The VCSEL array 11A is arranged near the focal length f on the incident side of the second optical element 13. The MEMS mirror 14A1 is arranged near the focal length f on the light exiting side of the second optical element 13.

The timing of light emission of the layers 111-1 to 111-4 of the VCSEL array 11A is controlled on an individual basis, and the layers 111-1 to 111-4 of the VCSEL array 11A are driven in sequence. The laser beams that are emitted from the layers 111-1 to 111-4 are prevented from diverging by the corresponding lens group 122-1 to 122-4 of the MLA 12A, and are incident on the projector lens (i.e., the second optical element 13). The positions 131-1 to 131-4 at which the laser beams are incident on the second optical element 13 vary in the sub-scanning direction depending on the layer 111 that is being driven. The laser beam that has passed through the second optical element 13 is focused by the corresponding one of reflection areas 148-1 to 148-4 of the uniaxial-scanning MEMS mirror 14A1, and is cast in a direction dependent on the angle that the incident laser beam forms with the MEMS mirror 14A1.

When the layer 111-1 is being driven, a projection image 10-1 sweeps in the main scanning direction at the first position in the sub-scanning direction. When the layer 111-2 is being driven, a projection image 10-2 sweeps in the main scanning direction at the second position in the sub-scanning direction. When the layer 111-3 is being driven, a projection image 10-3 sweeps in the main scanning direction at the third position in the sub-scanning direction. When the layer 111-4 is being driven, a projection image 10-4 sweeps in the main scanning direction at the fourth position in the sub-scanning direction.

In a similar manner to the first example as above, the scanning range in the main scanning direction depends on the scanning angle of the MEMS mirror 14A1. On the other hand, the scanning range in the sub-scanning direction is determined by the angle of divergence θ in the sub-scanning direction of the VCSEL array 11A, i.e., the size S of the light-emitting area of the entirety of the VCSEL array 11A, and the focal length f of the projector lens (i.e., the second optical element 13), using the First Equation as above.

The angular resolution dθ of the scanning laser beam in both the main scanning direction and the sub-scanning direction is determined by the focal length f of the projector lens (i.e., the second optical element 13) and the size a of the light-emitting area of each of the multiple layers 111 of the VCSEL array 11A, based on the Second Equation as above.

In FIG. 11, a plurality of layers 111-1 to 111-4 do not output laser beams at the same time. Instead, the timing of light emission is controlled for each one of the layers 111. As a result, measurement is performed independently in the four scanning areas divided in the sub-scanning direction.

There is a limit to the extent to which the size of the light-emitting area of each of the multiple layers 111 can be reduced. However, the laser beams that are emitted from the corresponding one of the layers 111 are prevented from diverging by the multiple lens groups 122 of the MLA 12A. Accordingly, a laser beam whose beam waist has been stopped down can be incident on the reflection area 148 of the MEMS mirror 14A1. Due to this configuration, the radiation intensity of light can be prevented from decreasing, and the laser beams can be scanned in a wide range while maintaining a high definition.

In place of the uniaxial MEMS mirror 14A1, any desired mirror such as a polygon mirror, where the angle of the movable mirror uniaxially changes with reference to the laser beam, may be used.

Fourth Example

Figure 12:
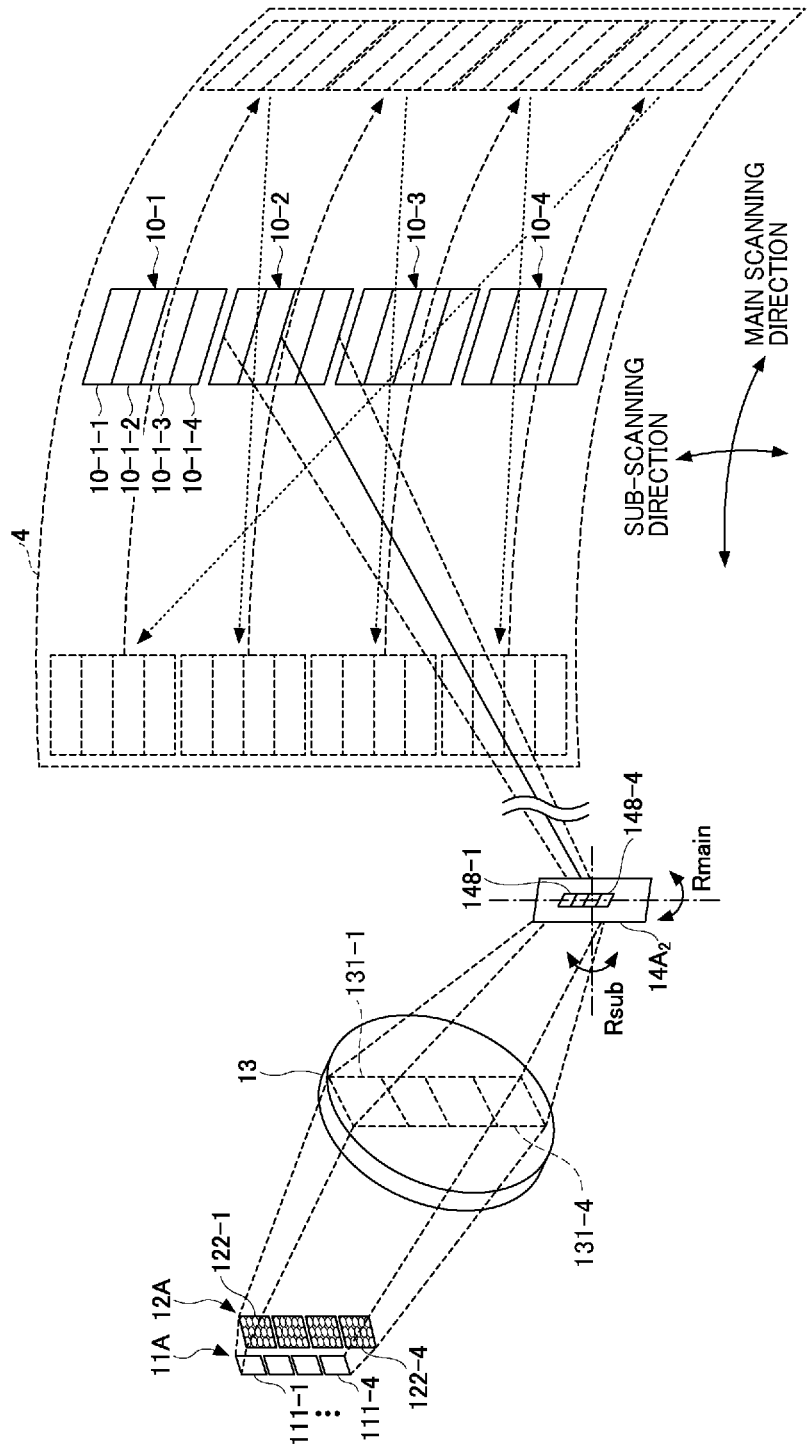
FIG. 12 is a diagram illustrating the optical scanning performed by a light emitter, according to a fourth example of the present disclosure.

FIG. 12 is a diagram illustrating the optical scanning performed by the light emitter 1, according to a fourth example of the present disclosure. In an example configuration as illustrated in FIG. 12, the VCSEL array 11A that include at least two layers 111 in the sub-scanning direction and the biaxial-scanning MEMS mirror 14A2 are used. The MEMS mirror 14A2 rotates on a principal axis Rmain to scan the laser beams in the main scanning direction, and rotates on a conjugate axis Rsub to shift the laser beams in the sub-scanning direction.

The laser beam that is emitted from the VCSEL array 11A is prevented from diverging by the MLA 12A, and are incident on the projector lens (i.e., the second optical element 13). The VCSEL array 11A is arranged near the focal length f on the incident side of the second optical element 13. The MEMS mirror 14A1 is arranged near the focal length f on the light exiting side of the second optical element 13.

In a similar manner to the third example, the timing of light emission of the layers 111-1 to 111-4 of the VCSEL array 11A is controlled on an individual basis, and the layers 111-1 to 111-4 of the VCSEL array 11A are driven in sequence. The laser beams that are emitted from the layers 111-1 to 111-4 are prevented from diverging by the corresponding lens group 122-1 to 122-4 of the MLA 12A, and are incident on the corresponding area of the projector lens (i.e., the second optical element 13).

The laser beam that has passed through the second optical element 13 is concentrated on the reflection area of the biaxial-scanning MEMS mirror 14A2, and is cast in a direction dependent on the angle that the incident laser beam forms with the MEMS mirror 14A2. The timing of light emission of the layers 111-1 to 111-4 of the VCSEL array 11A is controlled on an individual basis, and the layers 111-1 to 111-4 of the VCSEL array 11A are driven in sequence. The laser beams that are emitted from the layers 111-1 to 111-4 are prevented from diverging by the corresponding lens group 122-1 to 122-4 of the MLA 12A, and are incident on the projector lens (i.e., the second optical element 13). The positions 131-1 to 131-4 at which the laser beams are incident on the second optical element 13 drive vary in the sub-scanning direction depending on the layer 111 that is being driven.

The laser beam that has passed through the second optical element 13 is concentrated on one of the corresponding reflection areas 148-1 to 148-4 of the biaxial-scanning MEMS mirror 14A2, and is cast in a direction dependent on the angle that the incident laser beam forms with the MEMS mirror 14A2.

When the biaxial-scanning MEMS mirror 14A2 is inclined with reference to the conjugate axis Rsub by θsub-n, the projection images that are formed by the layers 111-1 to 111-4 are referred to as projection images 10-$n$-1 to 10-$n$-4, respectively. In a similar manner to the third example, when the layer 111-1 is being driven, a projection image 10-$n$-1 sweeps in the main scanning direction at the first position in the sub-scanning direction. When the layer 111-2 is being driven, a projection image 10-$n$-2 sweeps in the main scanning direction at the second position in the sub-scanning direction. When the layer 111-3 is being driven, a projection image 10-$n$-3 sweeps in the main scanning direction at the third position in the sub-scanning direction. When the layer 111-4 is being driven, a projection image 10-$n$-4 sweeps in the main scanning direction at the fourth position in the sub-scanning direction.

When the projection images 10-$n$-1 to 10-$n$-4 complete a sweep in the main scanning direction, the inclination of the biaxial-scanning MEMS mirror 14A2 with reference to the conjugate axis Rsub turns to θsub-(n+1), and a sweep of projection images 10-($n$+1)-1 to 10-($n$+1)-4 in the main scanning direction is performed in sequence. By repeating the above operation, scanning in the sub-scanning direction can be performed in a wider range compared with the third example.

In a similar manner to the first example, the scanning range in the main scanning direction depends on the scanning angle of the MEMS mirror 14A2 in the main scanning direction. On the other hand, the scanning range in the sub-scanning direction is determined by the First Equation and the scanning angle of the MEMS mirror 14A2 in the sub-scanning direction.

The angular resolution dθ of the scanning laser beam in both the main scanning direction and the sub-scanning direction is determined by the focal length f of the projector lens (i.e., the second optical element 13) and the size a of the light-emitting area of each of the multiple layers 111 of the VCSEL array 11A, based on the Second Equation as above.

In FIG. 12, a plurality of layers 111-1 to 111-4 do not output laser beams at the same time. Instead, the timing of light emission is controlled for each one of the layers 111. Accordingly, measurement is performed within the scanning range 4 independently in the four scanning areas divided in the sub-scanning direction.

There is a limit to the extent to which the size of the light-emitting area of each of the multiple layers 111 can be reduced. However, the laser beams that are emitted from the multiple layers 111 of the VCSEL array 11A are prevented from diverging by the multiple lens groups 122 of the MLA 12A. Accordingly, a laser beam whose beam waist has been stopped down is incident on the corresponding reflection area 148 of the MEMS mirror 14A2. Due to this configuration, the radiation intensity of light can be prevented from decreasing, and the laser beams can be scanned in a wide range while maintaining a high definition.

In place of the biaxial-scanning MEMS mirror 14A2, any desired mirror such as a polygon mirror, where the angle of the movable mirror biaxially changes with reference to the laser beam, may be used.

Fifth Example

Figure 13:
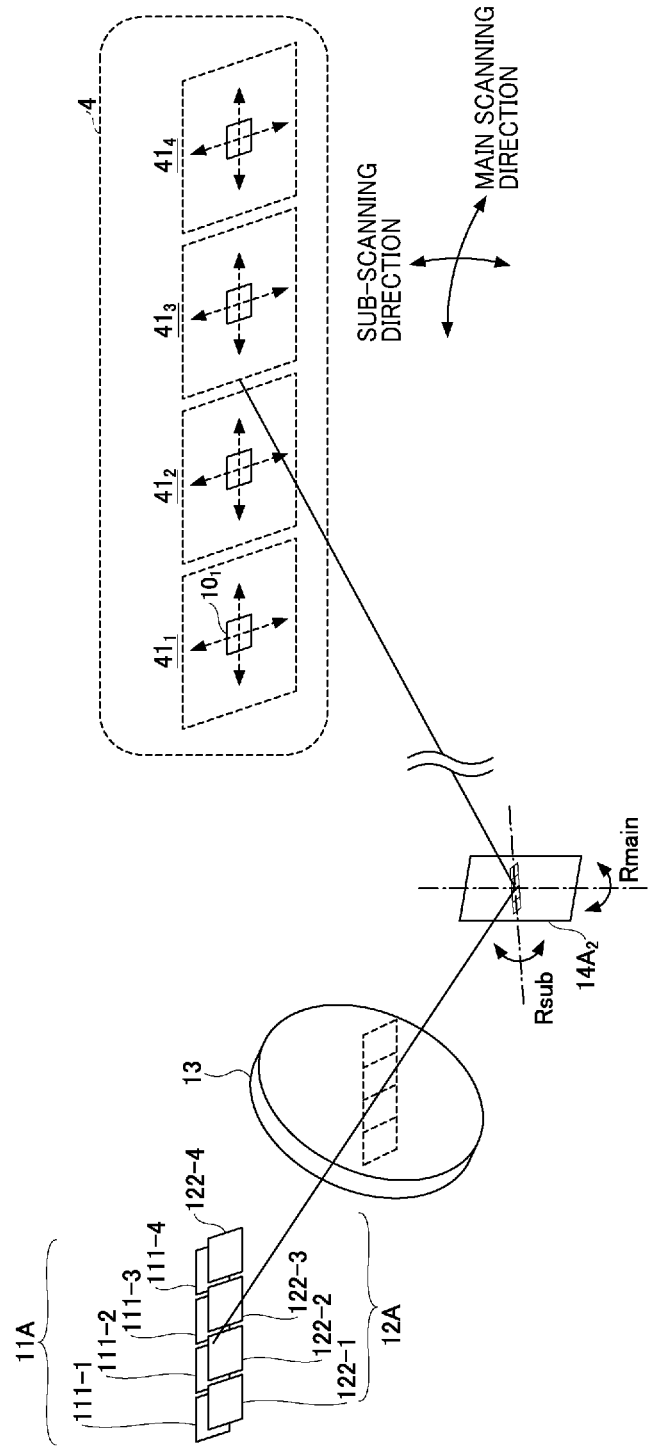
FIG. 13 is a diagram illustrating the optical scanning performed by a light emitter, according to a fifth example of the present disclosure.

FIG. 13 is a diagram illustrating the optical scanning performed by the light emitter 1, according to a fifth example of the present disclosure. In the fifth example, the VCSEL array 11A that include at least two layers 111 in the main scanning direction and the movable mirror 14 of a uniaxial-scanning type or a biaxial-scanning type are used. In the present example as illustrated in FIG. 13, the biaxial-scanning MEMS mirror 14A2 is used.

In the first to fourth examples as above, the multiple layers 111 are scanned in a wide angle by the movable mirror 14. By contrast, in the fifth example, scanning area is divided for each of the layers 111.

The laser beam that is emitted from the VCSEL array 11A is prevented from diverging by the MLA 12A, and are incident on the projector lens (i.e., the second optical element 13). The VCSEL array 11A is arranged near the focal length f on the incident side of the second optical element 13. The MEMS mirror 14A2 is arranged near the focal length f on the light exiting side of the second optical element 13.

The laser beam that has passed through the second optical element 13 is concentrated on the corresponding reflection area of the MEMS mirror 14A2, and is cast in a direction dependent on the angle that the incident laser beam forms with the MEMS mirror 14A2.

Among the multiple layers 111 of the VCSEL array 11A arranged in the main scanning direction, the laser beams that are emitted from the layer 111-1 are incident on the corresponding area of the second optical element 13, and a projection image 101 is formed on a scanning area 411. In a similar manner, the laser beams that are emitted from a layer 111-$k$ (in the example of FIG. 13, k denotes an integer of 1 to 4) are projected onto the corresponding scanning area 41$k$ by the second optical element 13, and an optical image 10$k$ is formed.

As the MEMS mirror 14A2 performs scanning in the main scanning direction and the sub-scanning direction, the optical image 10$k$ sweeps the entirety of the scanning area 41$k$. The angular resolution dθ in this configuration in both the main scanning direction and the sub-scanning direction is based on the Second Equation as above. The scanning range 4 in the main scanning direction is determined by the product of the optical scanning range of the multiple layers 111 due to the scanning performed by MEMS mirror 14A2 and the number of layers of the VCSEL array 11A. The scanning range in the sub-scanning direction is determined by the scanning range of the layers 111 due to the scanning performed by MEMS mirror 14A2. The scanning range of the movable mirror 14 may be changed such that the size of the scanning area 41 varies for each of the multiple layers 111.

Sixth Example

Figure 14:
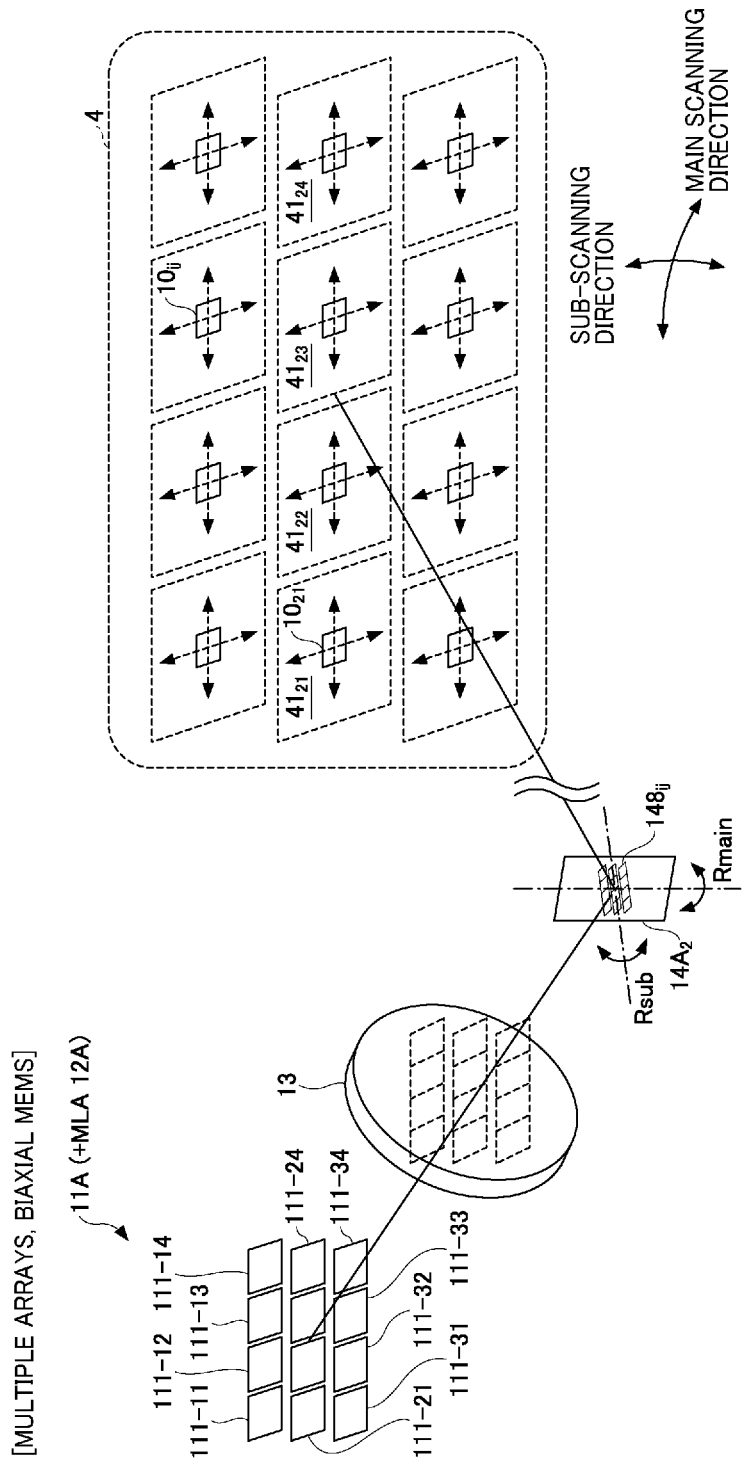
FIG. 14 is a diagram illustrating the optical scanning performed by a light emitter, according to a sixth example of the present disclosure.

FIG. 14 is a diagram illustrating the optical scanning performed by the light emitter 1, according to a sixth example of the present disclosure. In the sixth example, the multiple layers 111 of the VCSEL array 11A are two-dimensionally arranged in the main scanning direction and the sub-scanning direction, in comparison to the scanning in the fifth example as above. For purposes of simplification, the image of the MLA 12A is omitted in FIG. 14. Moreover, in accordance with the two-dimensional arrangement of the layers 111, the multiple lens groups 122 of the MLA 12A are two-dimensionally arranged in FIG. 14.

In the present example, each of the layers 111 of the VCSEL array 11A is referred to as a layer 111-$ij$ (where each of i and j denotes a natural number). The laser beams that are emitted from the layer 111-$ij$ are prevented from diverging by the corresponding lens group 122-$ij$ of the MLA 12A, and are incident on the corresponding reflection area 148$ij$ of the MEMS mirror 14A2 after passing through the second optical element 13. The optical image 10$ij$ of the laser beams reflected by the MEMS mirror 14A2 is projected onto a scanning area 41$ij$.

As the MEMS mirror 14A2 is scanned in the main scanning direction and the sub-scanning direction, the optical image 10$ij$ scans the entirety of the scanning area 41$ij$. The angular resolution dθ in the present example is based on the Second Equation as above in both the main scanning direction and the sub-scanning direction. The scanning range in both the main scanning direction and the sub-scanning direction is determined by the product of the optical scanning range of the layers 111 due to the scanning performed by MEMS mirror 14A2 and the number of layers of the VCSEL array 11A in each of the scanning directions. The scanning range of the movable mirror 14 may be changed such that the size of the scanning area 41 varies for each of the multiple layers 111.

Figure 15A:
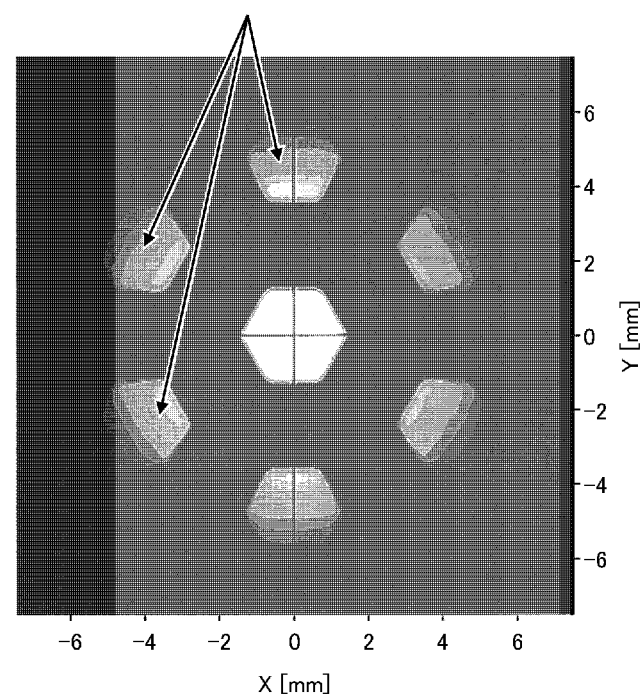
FIG. 15A is a diagram illustrating an intensity distribution of the laser beams, at a beam-waist position, that have passed through a microlens array (MLA), when some of the laser beams is incident on neighboring microlenses, according to an embodiment of the present disclosure.
Figure 15B:
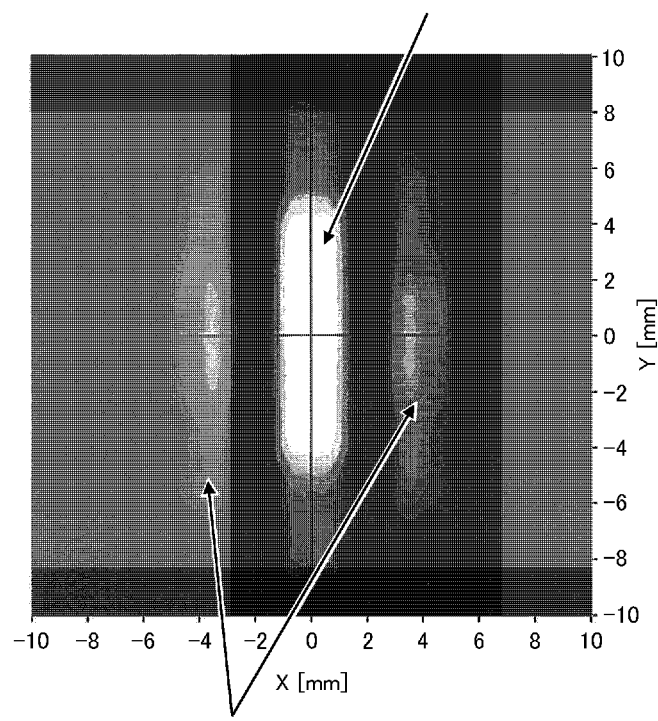
FIG. 15B is a diagram illustrating an intensity distribution of the light that is cast to a remote point by a movable mirror, according to an embodiment of the present disclosure.

Relative Positions of Light Emitting Elements of VCSEL and Lens Elements FIG. 15A and FIG. 15B are diagrams each illustrating the intensity distribution of a laser beam when the laser beams that are emitted from a light emitting element 112$n$ are incident not only on the corresponding lens element 121$n$ but also on an adjacent microlenses 121($n$+1), according to the present embodiment.

FIG. 15A is a diagram illustrating an intensity distribution at the beam waist position, i.e., an intensity distribution on the reflection plane of the movable mirror 14, according to an embodiment of the present disclosure. The light that is emitted from one of the light emitting elements 112 and is incident on the corresponding lens element 121 is focused on the center point, and indicates a high beam intensity. By contrast, the light that is incident on a lens element existing in a peripheral area is focused on a position different from the image forming position of the target lens element 121, and forms an image at a position deviating from the center point, even at the beam waist position after passing through the second optical element 13. The light that is focused on a peripheral area does not only end up as an optical loss without striking the movable mirror 14, but also emerges as stray light at a beam-waist position.

FIG. 15B illustrates an intensity distribution of the light that is cast (reflected) to a remote point by the movable mirror 14, according to the present embodiment. The laser beams that are reflected by the movable mirror 14 are cast to a remote point, and the shape of the spot is dispersed in the Y-direction. Even when the shape of the spot is dispersed, the laser beams that are incident on the movable mirror 14 after passing through the corresponding lens element maintain the intensity to a certain degree. The stray light that leaks to the area around after passing through a neighboring lens element emerges as stray light of the scanning laser beams. The stray light that is present in the periphery of the light to be used to measure the distance leads to erroneous detection.

In addition to the necessity for the optical axes of the light emitting elements 112 and the lens elements 121 to match, it is desired that the light emitting elements 112 and the lens elements 121 be arranged such that laser beams do not enter neighboring lens elements.

As an example arrangement, the convex surfaces of the lens elements 121 of the MLA 12A face the side of the light emitting elements 112 such that the emergence of stray light is prevented in the present embodiment.

Figure 16A:
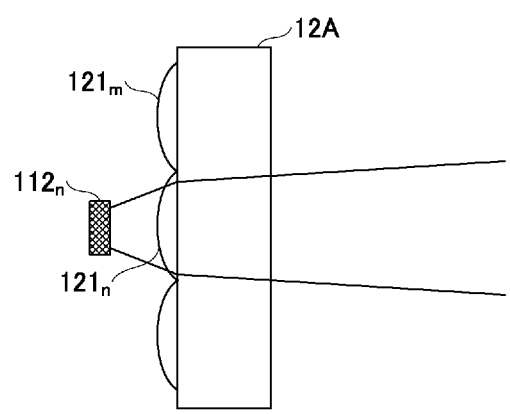
FIG. 16A, FIG. 16B, and FIG. 16C are diagrams each illustrating the relative positions of a light emitting element and the lens elements of a MLA.
Figure 16B:
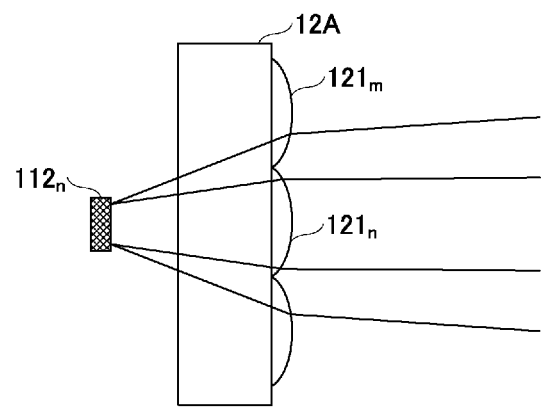
Figure 16C:
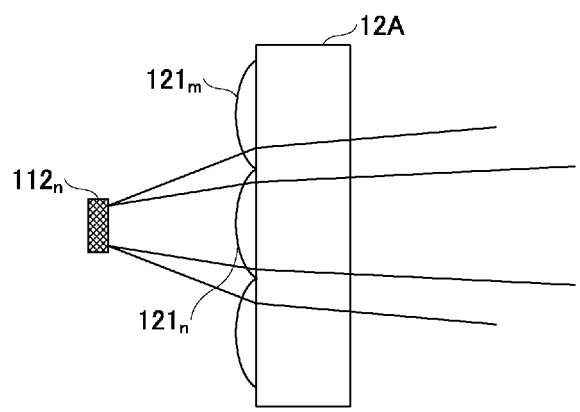

FIG. 16A, FIG. 16B, and FIG. 16C are diagrams each illustrating the principle of the lens arrangement according to the present embodiment.

When the lens elements 121 are planoconvex lenses, the MLA 12A is a lens element array of a plano-convex type in which the multiple lens elements 121 of a convex shape are formed on one side. Typically, as illustrated in FIG. 16B, the flat side of a planoconvex lens faces the side of the light emitting elements 112 in view of the aberration. However, the effective diameter of each of the lens elements 121 is small in the case of the MLA 12A, and as known in the art, the thickness of a MLA substrate is on the order of several hundred micrometers (μm) to several millimeters (mm) (for example, 100 μm to 10 mm). As illustrated in FIG. 16B, when the flat side of the planoconvex lens faces the side of the light emitting elements 112, at the timing when the laser beams that are emitted from a light emitting element 112n reach the convex surface of the lens element 121n the laser beams are dispersed equal to or wider than the diameter of the lens element 121n, and strike a neighboring lens element 121m.

In order to handle such a situation, in one example embodiment, as illustrated in FIG. 16A, the convex surfaces of the lens elements 121 face the side of the light emitting elements 112. In the case of LiDAR devices, it is satisfactory as long as the laser beams can be controlled within a specific scanning range with a prescribed angular resolution. Accordingly, the spherical aberration on the imaging plane does not have to be controlled in a strict sense. In other words, the operation of the light emitter 1 is almost not at all affected even if the flat side of the MLA does not face the side of the light emitting elements 112.

However, when the distance between the light-emitting surface of the VCSEL and the MLA 12A is too long in such a case as above where the convex surfaces of the lens elements 121 face the side of the light emitting elements 112, as illustrated in FIG. 16C, laser beams enter neighboring lens elements, and stray light emerges. In order to avoid such a situation, the convex surfaces of the lens elements 121 are arranged at distance where the optical axes of the light emitting elements 112 match the optical axes of the lens elements 121 and the laser beams that are emitted from the light emitting element 112 do not strike the neighboring ones of the lens elements 121.

Figure 17A:
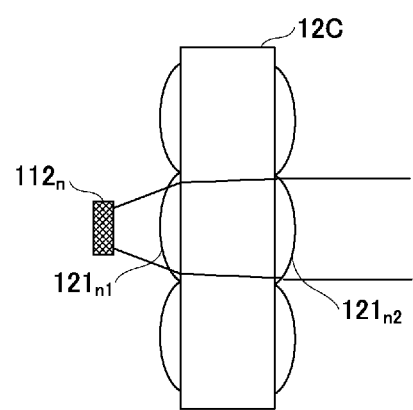
FIG. 17A, FIG. 17B, and FIG. 17C are diagrams each illustrating the relative positions of light emitting elements and lens elements when a MLA of a double-convex type is used, according to an embodiment of the present disclosure.
Figure 17B:
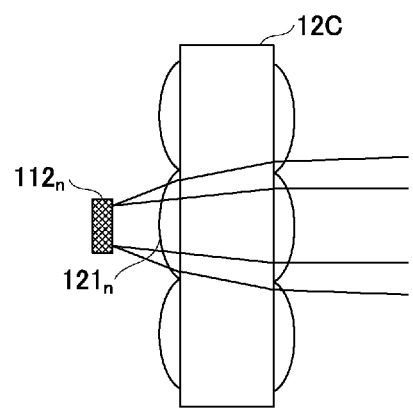
Figure 17C:
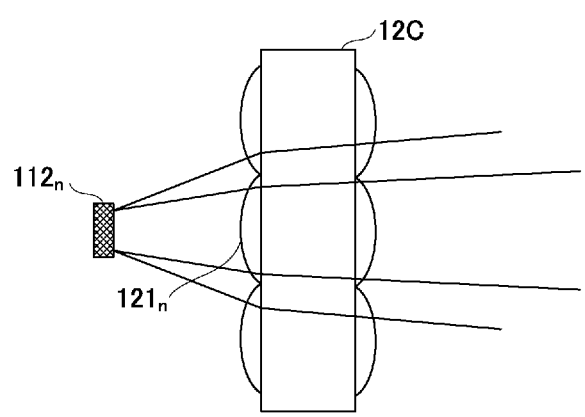

FIG. 17A, FIG. 17B, and FIG. 17C are diagrams each illustrating the relative positions of the light emitting elements 112 and the lens elements 121 when the MLA 12C of a double-convex type that has lens elements 121n1 and 121n2 on both sides is used as the first optical element 12, according to the present embodiment. As the lens elements 121n1 and 121n2 of convex type are arranged on both sides of the MLA 12C, the divergence angle can further be controlled compared with a configuration with convex lenses on one side. In this configuration, each of the lens element 121n1 on the incident side of the MLA 12C and the lens element 121n2 on the light exiting side of the MLA 12C is coaxially arranged with the corresponding light emitting element 112n.

FIG. 17A is a diagram illustrating the appropriate relative positions of the light emitting element 112n and the lens elements 121n1 and 121n2, according to the present embodiment. The laser beams that are emitted from the light emitting element 112n are incident on the convex surface of the lens element 121n1 before the beam diameter of those laser beams becomes wider than the lens diameter. The divergence angle of the incident laser beams is effectively controlled by the lens element 121n1 and the lens element 121n2.

FIG. 17B is a diagram illustrating an arrangement in which the distance between the light emitting element 112n and the lens element 121n1 on the incident side is too short, according to the present embodiment. On the incident side, the laser beams are not incident on the neighboring lens element 121. However, at the timing when the laser beams reach the convex surface of the lens element 121n2 on the on the light exiting side, the beam diameter of those laser beams becomes wider than the lens diameter.

FIG. 17C is a diagram illustrating an arrangement in which the distance between the light emitting element 112n and the lens element 121n1 on the incident side is too long, according to the present embodiment. However, at the timing when the laser beams reach the convex surface of the lens element 121n1 on the on the incident side, the beam diameter of those laser beams becomes wider than the lens diameter.

When the MLA 12C of a double-convex type is used, it is desired to be configured such that the laser beams enter only the corresponding one of the lens elements 121 on both the light entering side and the light exiting side. Due to such a configuration, the emergence of stray light can be prevented.

Figure 18:
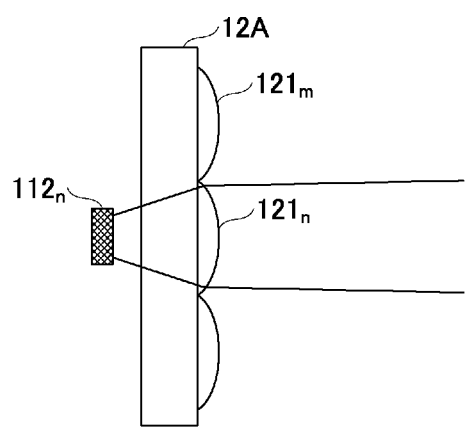
FIG. 18 is a diagram illustrating an example embodiment in which the convex surfaces of lens elements are arranged on the light exiting side of a MLA.

FIG. 18 is a diagram illustrating an example embodiment in which the convex surfaces of the lens elements 121 are arranged on the light exiting side of the MLA 12A. When the MLA substrate is so thin that the laser beams that are emitted from the light emitting element 112n do not enter a neighboring lens elements 121m, the laser beams enter only the corresponding lens element 121n, and the laser beams exit through the convex surface of that lens element 121n. In such cases, the convex surfaces of the MLA 12A may be arranged on the light exiting side as illustrated in FIG. 18. In other words, in such cases as above, the flat side of the MLA 12A may be arranged to face the VCSEL array 11A. When the flat side of the MLA 12A faces the side of the light emitting elements 112, a VCSEL substrate can be bonded together with a MLA substrate as a package at a wafer level. Accordingly, the productivity may increase and the cost may be reduced, which is advantageous. The thickness of the MLA substrate as illustrated in FIG. 18 is designed as appropriate in view of the laser beams emitted from light emitting elements.

Focal Length of MLA and Distance between VCSEL and MLA When the first optical element 12 such as the diffraction element array 12B and the MLA 12A or 12C is used, the divergence angles of the laser beams output from the multiple light emitting elements 112 of the VCSEL array 11A can efficiently be controlled. However, if the light-emitting areas of the light emitting elements are increased to achieve high output power, the reducing effect on the divergence angle, which is caused by the first optical element 12, may be affected in an imaging system.

If the light-emitting areas are increased in the VCSEL array 11A where the light emitting elements 112 are arranged at equal distances, the beam diameter of the laser beams increases. In order to prevent the laser beams from entering the neighboring lens elements 121 of the MLA 12A, the distance between the VCSEL array 11A and the MLA 12A needs to be shortened. On the other hand, in the imaging system, the focal length of the MLA is shortened, and the divergence angle increases.

In order to handle such a situation, in the present embodiment, the first optical element 12 whose focal length is equal to or longer than the distance d between the laser beam source 11 (that is composed of, for example, the VCSEL array 11A) and the first optical element 12 (for example, the MLA 12A) is used to achieve the reducing effect on the divergence angle.

When the focal length fMLA of the MLA 12A is made longer than the distance d to the VCSEL array 11A, the laser beams are deflected by a surface with reduced curvature (large radius of curvature) compared with curvature with which the laser beams are oriented in a parallel direction under ordinary circumstances. Accordingly, the refractive power of light from each light-emitting point is weakened. In other words, the divergence angle becomes small compared with when the focal length fMLA of the MLA 12A is controlled to match the distance d between the VCSEL and the MLA.

Figure 19A:
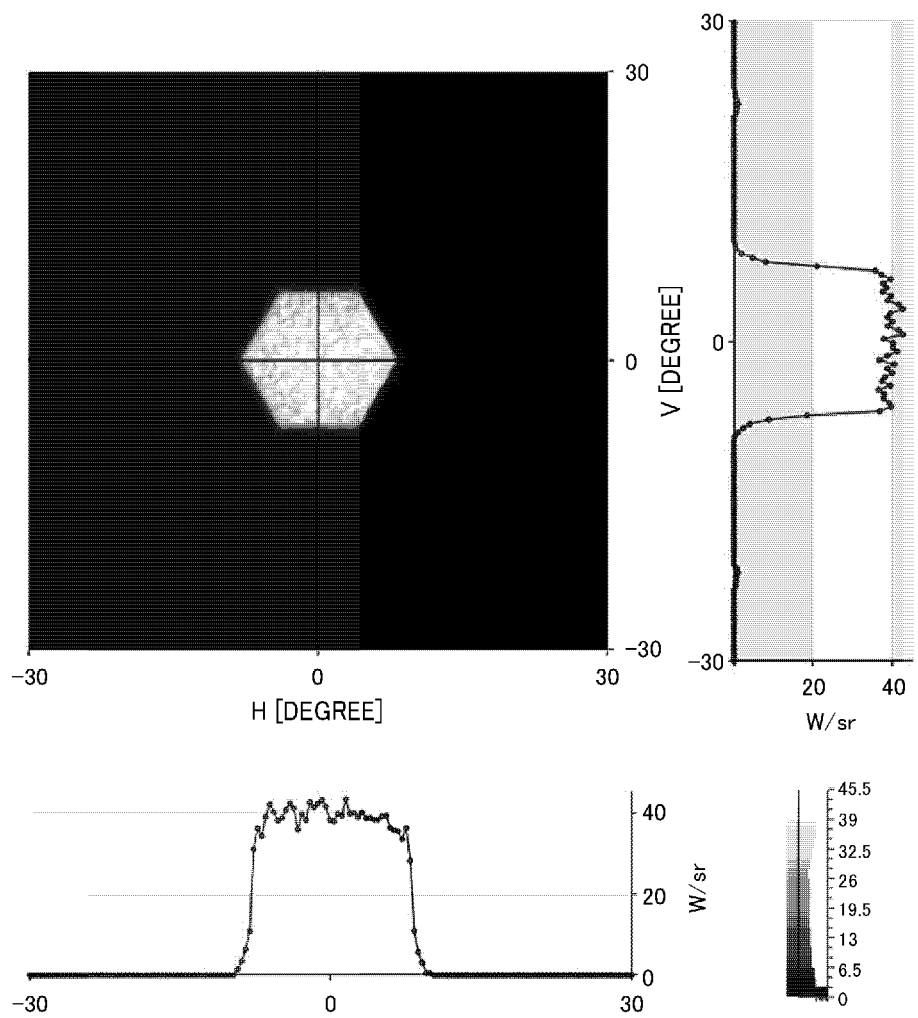
FIG. 19A is a diagram illustrating an angular distribution of the laser beam emitted through a MLA when the focal length of the MLA matches the distance between a VCSEL and the MLA, according to an embodiment of the present disclosure.
Figure 19B:
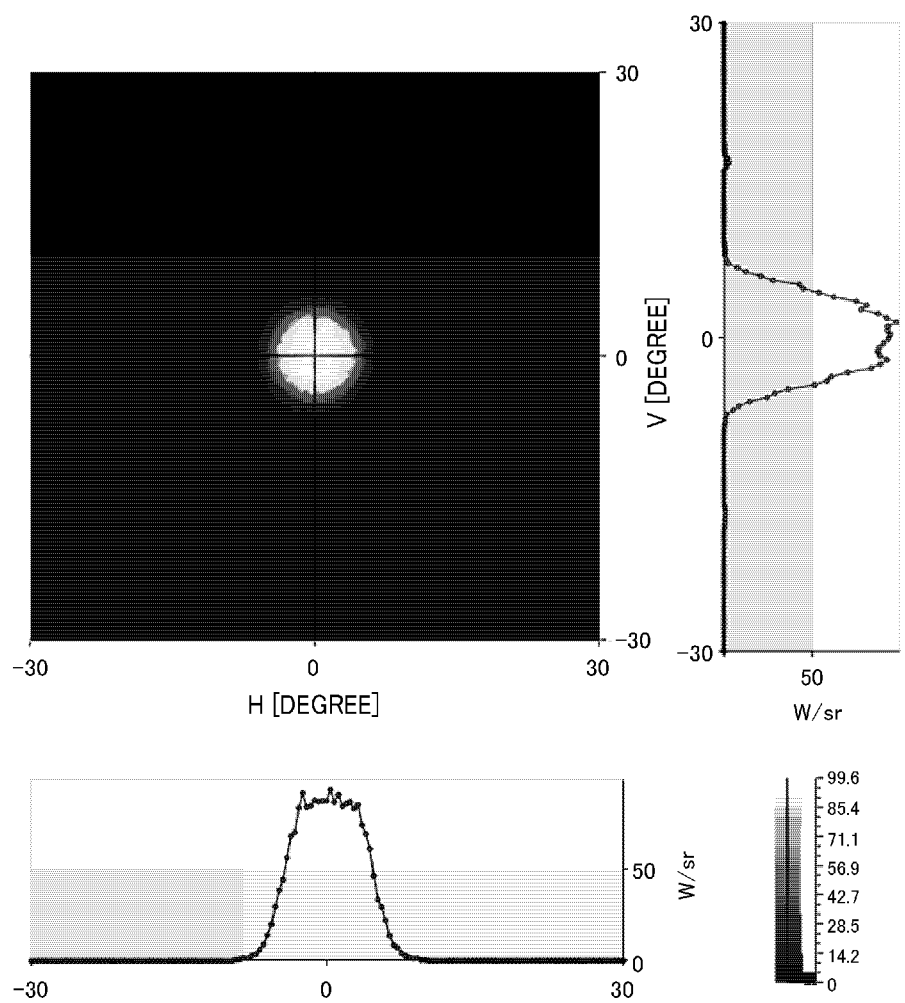
FIG. 19B is a diagram illustrating an angular distribution of the laser beam emitted through a MLA when the focal length of the MLA is longer than the distance between a VCSEL and the MLA, according to an embodiment of the present disclosure.

FIG. 19A and FIG. 19B are diagrams each illustrating an angular distribution of the laser beam emitted through a MLA, according to an embodiment of the present disclosure. FIG. 19A is a diagram illustrating an angular distribution when the focal length fMLA of the MLA matches the distance d between the VCSEL and the MLA (fMLA=d), according to the present embodiment. FIG. 19B is a diagram illustrating an angular distribution when the focal length fMLA of the MLA is longer than the distance d between the VCSEL and the MLA (fMLA>d), according to the present embodiment.

In both FIG. 19A and FIG. 19B, the incident plane of the MLA 12A is arranged away from the laser beam source whose divergence angle is 18.5 degrees by 80 micrometers (μm) (d=80 μm), the radiance is used as a function of the angle in the horizontal direction (H) and the vertical direction (V) to measure the angle.

The angular distribution in FIG. 19B (fMLA>d) is closer to a normal distribution than the distribution in FIG. 19A (fMLA=d), and the divergence angle in FIG. 19B is smaller than the divergence angle in FIG. 19A. When laser beams with broad angular distribution are focused on the same beam diameter, the intensity gets higher at the center and the intensity gets lower in the perimeter zone compared with laser beams whose angular distribution is narrow (see the distribution profile of FIG. 19B).

The loss in light quantity at the movable mirror 14 is equivalent to the loss in light quantity of the perimeter zone of the laser beams that were not concentrated on the movable mirror 14. Accordingly, even if the divergence angles of laser beams are all the same, the image of laser beams with broader angular distribution can be formed on the movable mirror 14, with a smaller amount of loss in light quantity. As a result, the power of the laser beams that are emitted from the LiDAR device increases, and the distance to an object at a long distance can be measured.

When a MLA whose focal length is longer than the distance d between the VCSEL and the MLA is used, the loss in light quantity can be reduced in the imaging optical system towards the movable mirror 14, and the LiDAR device can measure the distance with an improved level of performance.

Figure 20A:
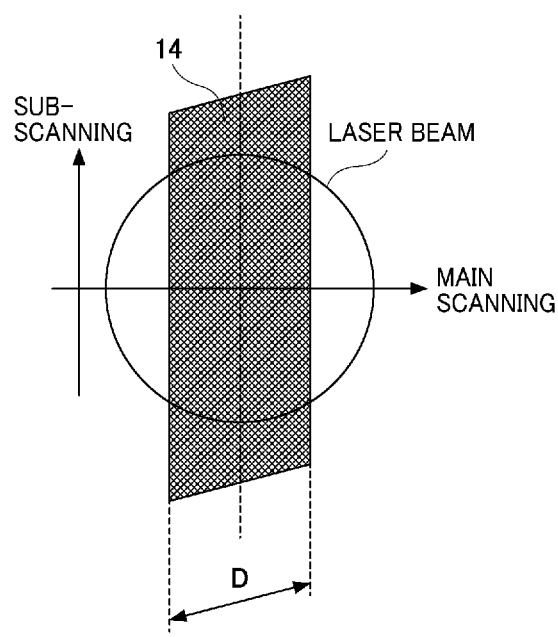
FIG. 20A and FIG. 20B are diagrams each illustrating the light-receptive width of a movable mirror and the beam-waist shape of a laser beam, according to an embodiment of the present disclosure.
Figure 20B:
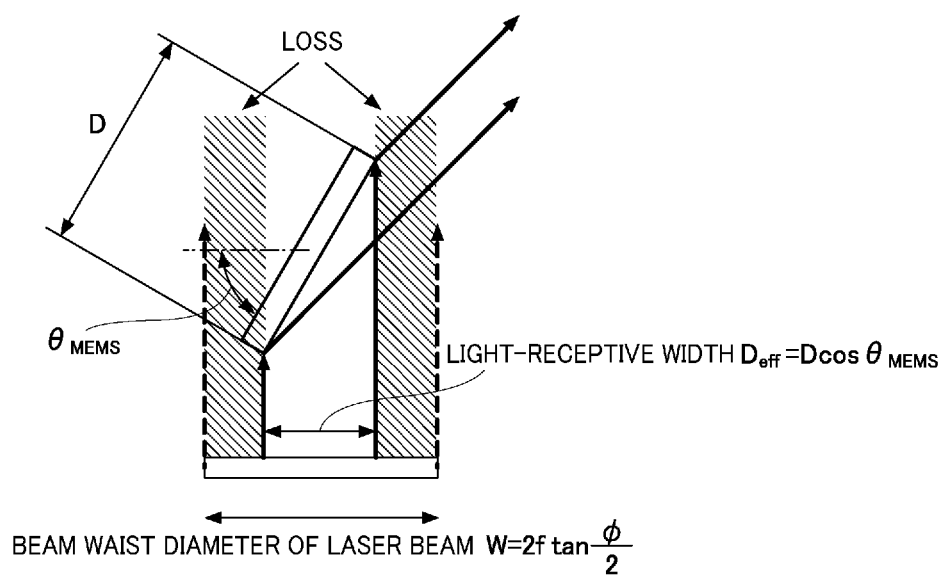

FIG. 20A and FIG. 20B are diagrams each illustrating the light-receptive width of the movable mirror 14 and the beam-waist shape, according to the present embodiment. In the LiDAR devices, laser beams are scanned upon varying the angle of the movable mirror 14 with reference to the incident laser beam. Regarding the uniaxial movable mirror 14, the light-receptive width Deff of the movable mirror 14 is expressed in an equation given below, using the width D of the movable mirror 14 and the inclination θMEMS of the movable mirror 14 with reference to the incident laser beam.
Deff=D×cosθMEMS As the inclination of the movable mirror 14 increases, the light-receptive width becomes shorter. When wide-angle scanning is performed, the radiation intensity of the laser beam that is not focused on the movable mirror 14 increases as the rotation angle of the movable mirror 14 increases, and the utilization efficiency of light may be affected. In the present embodiment, the divergence angle of the laser beams is reduced in advance by the first optical element 12, to minimize the loss in light quantity even in the wide-angle scanning.

Figure 21A:
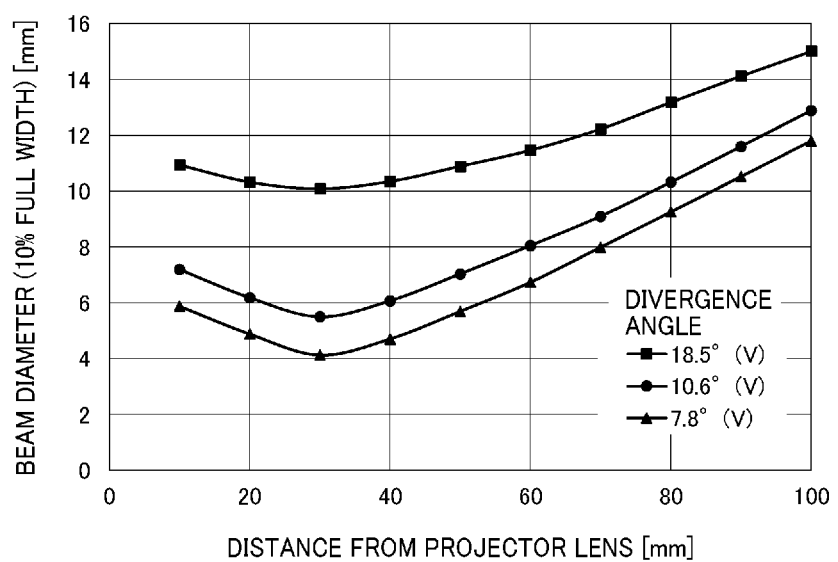
FIG. 21A and FIG. 21B are diagrams each illustrating the relation between the divergence angle and the beam diameter of a laser beam, according to an embodiment of the present disclosure.
Figure 21B:
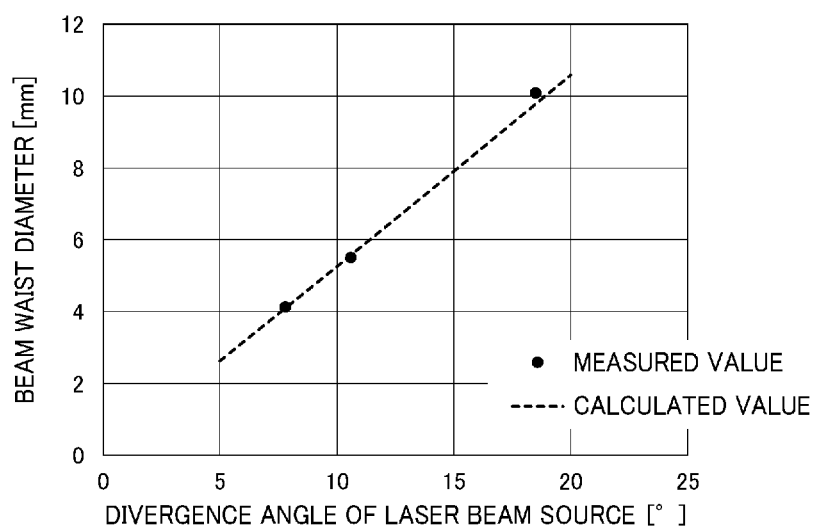

FIG. 21A and FIG. 21B are diagrams each illustrating the relation between the divergence angle and the beam diameter of the laser beam source, according to the present embodiment. FIG. 21A is a diagram illustrating the beam diameter in the sub-scanning direction when laser beams with varying divergence angles are concentrated on the projector lens (i.e., the second optical element 13), according to the present embodiment. The beam diameters obtained when laser beams whose divergence angle is 18.5 degrees are concentrated by a projector lens whose focal length is 30 millimeters (mm) are obtained as a function of the distance from the projector lens, and are plotted as the square marks as illustrated in FIG. 21A. The beam diameters obtained when the laser beams whose divergence angle is controlled to be 10.6 degrees by the MLA 12A are concentrated by a projector lens whose focal length is 30 millimeters (mm) are obtained and plotted as black dots as illustrated in FIG. 21A. The beam diameters obtained when the laser beams whose divergence angle is controlled to be 7.8 degrees by the MLA 12A are concentrated by a projector lens whose focal length is 30 millimeters (mm) are obtained and plotted as triangular marks as illustrated in FIG. 21A.

Regardless of the presence or absence of the MLA 12A, the laser beams form their beam waists at a position away from the projector lens by 30 mm, which matches the focal length of the projector lens. If the divergence angle is further controlled by the MLA 12A, the laser beams may be concentrated with an even smaller beam diameter.

FIG. 21B is a graph in which beam waist diameters are plotted as a function of the divergence angle of the laser beam, according to the present embodiment. The black dots indicate measured values, and the dotted lines indicate values calculated based on the Third Equation as given above. The focal length f of the projector lens in the Third Equation is 30 mm.

The result of calculation matches the actual beam waist diameter, and the presence or absence of an MLA does not matter as long as the light-emitting system is concerned. The beam waist diameter after passing through the projector lens (i.e., the second optical element 13) can be reduced (see the Third Equation as above), depending on the divergence angle of the laser beam after that laser beam is concentrated by the projector lens.

Figure 22:
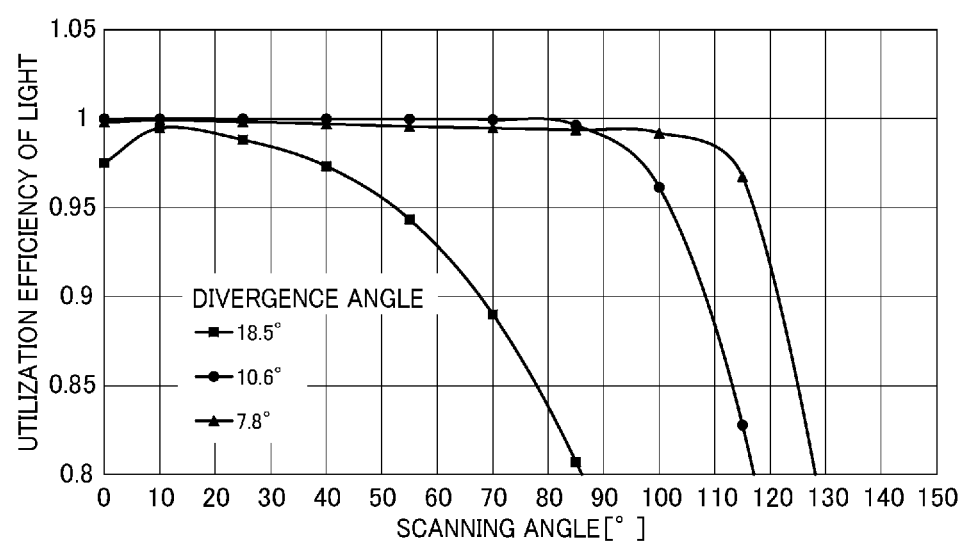
FIG. 22 is a diagram illustrating the utilization efficiency of light for different scanning angles when scanning is performed with varying divergence angles, according to an embodiment of the present disclosure.

FIG. 22 is a diagram illustrating the utilization efficiency of light for different scanning angles when scanning is performed with varying divergence angles, according to the present embodiment. In a similar manner to FIG. 21A and FIG. 21B, a laser beam whose divergence angle is 18.5 degrees where no MLA is involved and laser beams with the divergence angles of 10.6 degrees and 7.8 degrees where a MLA is used are concentrated on the uniaxial-scanning MEMS mirror 14A by a projector lens whose focal length is 30 mm, respectively, at the beam waist position. The size of the MEMS mirror 14A is 10 mm×14 mm in the horizontal direction and the vertical direction. More specifically, FIG. 22 is a diagram illustrating the utilization efficiency of light for different scanning angles when the MEMS mirror 14A rotates in the main scanning direction within the range of 140 degrees, according to the present embodiment.

As described above, as the divergence angle is smaller, the beam waist diameter W of the laser beams that are concentrated by the projector lens becomes small. Accordingly, the utilization efficiency of light improves when the scanning angle gets wider, and distance can be measured in a wide range of angle. For example, assuming that the measurable range is an area with utilization efficiency of light of 95% or greater, the scannable range of angle is increased from 55° to 100° when the divergence angle is controlled by the MLA from 18.5° to 10.6°. Further, the scannable range of angle is increased from 100° to 120° when the divergence angle is controlled by the MLA from 10.6° to 7.8°.

If such reduction in divergence angle as above is to be applied to a LiDAR device, the divergence angle of the VCSEL array 11A is controlled by the MLA 12A. As a result, the light can be concentrated on the movable mirror 14 whose area of mirror is small (for example, the length of a rectangular reflection mirror in the shorter-side direction is about 1 mm to 20 mm) in an efficient manner, and long distances can be measured in a wide range of angle.

Figure 23:
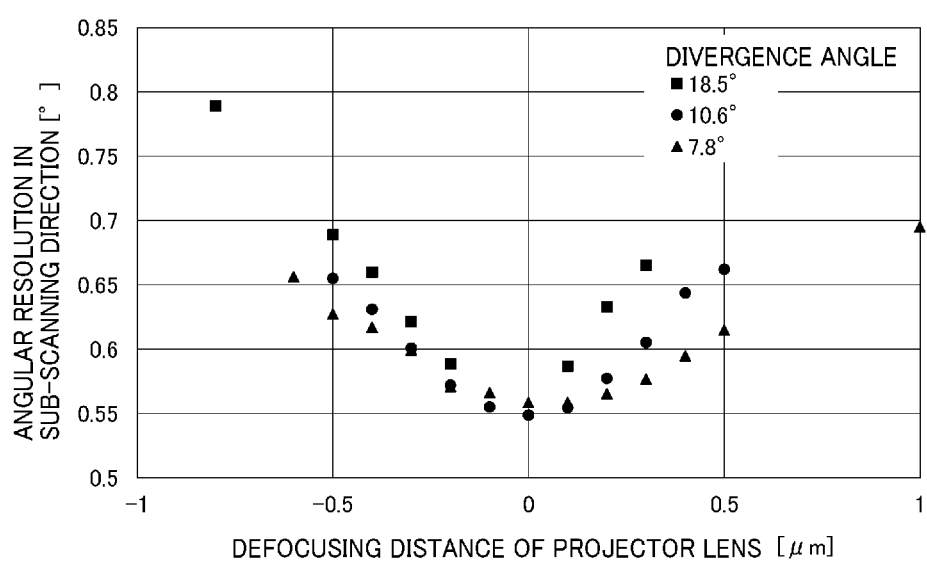
FIG. 23 is a diagram illustrating the relation between the amount of defocusing of a projector lens and the angular resolution in the sub-scanning direction of each divergence angle, according to an embodiment of the present disclosure.

FIG. 23 is a diagram illustrating the relation between the amount of defocusing of the projector lens and the angular resolution in the sub-scanning direction of each divergence angle, according to the present embodiment. The amount of defocusing of the projector lens indicates the distance in which the projector lens is moved from the focal point along the optical axis. The negative side in the horizontal axis indicates cases in which the projector lens is made close to the VCSEL array, and the positive side in the horizontal axis indicates cases in which the projector lens is moved away from the VCSEL array.

As a secondary effect achieved by decreasing the divergence angle, easing of the precision of installation of the projector lens is achieved. As understood from FIG. 23, as the divergence angle is decreased, variations a in angular resolution are small when the projector lens is displaced from the focal length. As the divergence angle of the VCSEL array 11A is controlled due to the MLA 12A, variations in the angular resolution of the projector lens (i.e., the second optical element 13) decrease, and easing of the precision of installation of the projector lens is achieved.

Figure 24:
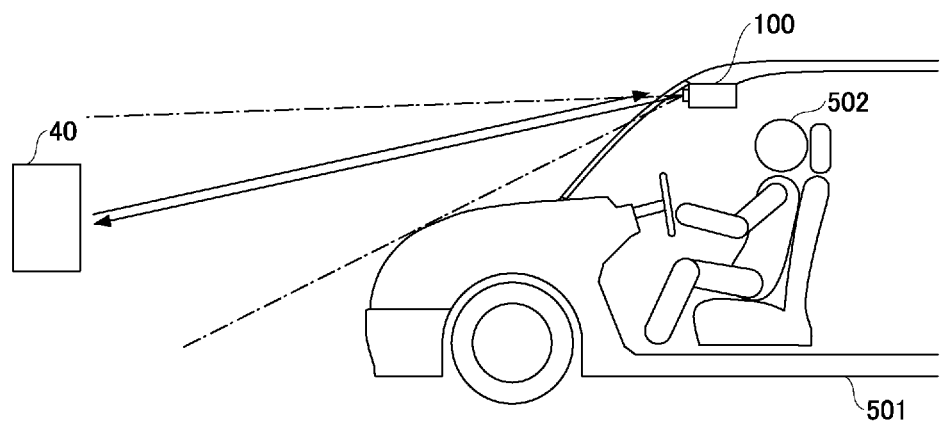
FIG. 24 is a schematic diagram illustrating a mobile object provided with a LiDAR device according to an embodiment of the present disclosure.

FIG. 24 is a schematic diagram illustrating a mobile object installed with the LiDAR device 100, according to the present embodiment. For example, the mobile object is a vehicle 501 driven by a driver 502, and the LiDAR device 100 is attached to the upper side of the front windshield or the ceiling of the front seat of the vehicle 501. For example, the LiDAR device 100 performs optical scanning in the directions of travel of the vehicle 501 to receive the light reflected by the object 40 existing in the directions of travel, By so doing, the LiDAR device 100 can recognize the object 40. The light emitter 1 of the LiDAR device 100 performs optical scanning upon controlling the divergence angle of the laser beam in advance by the first optical element 12 such as a microlens array (MLA). Accordingly, the optical loss at a scanner such as the movable mirror 14 can be reduced, and the laser beam can be case to a remote point with a high angular resolution.

Note that the position to which the LiDAR device 100 is attached is not limited to the front and upper side of the vehicle 501, but may be attached to a side or on the rear of the vehicle 501. In addition to the application to a vehicle, the LiDAR device 100 is applicable to any mobile object such as a flight vehicle such as an aircraft and a drone, and an autonomous mobile object such as a robot. By adopting the configuration of the light emitter 1 according to the embodiments of the present disclosure, the existence and position of an object can be detected in a wide range.

The present disclosure can be implemented in any convenient form, for example using dedicated hardware, or a mixture of dedicated hardware and software. The present disclosure may be implemented as computer software implemented by one or more networked processing apparatuses. The processing apparatuses can compromise any suitably programmed apparatuses such as a general purpose computer, personal digital assistant, mobile telephone (such as a WAP or 3G-compliant phone) and so on. Since the present disclosure can be implemented as software, each and every aspect of the present disclosure thus encompasses computer software implementable on a programmable device. The computer software can be provided to the programmable device using any conventional carrier medium (carrier means). The carrier medium can compromise a transient carrier medium such as an electrical, optical, microwave, acoustic or radio frequency signal carrying the computer code. An example of such a transient medium is a TCP/IP signal carrying computer code over an IP network, such as the Internet. The carrier medium can also comprise a storage medium for storing processor readable code such as a floppy disk, hard disk, CD ROM, magnetic tape device or solid state memory device.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

This patent application is based on and claims priority pursuant to 35 U.S.C. § 119(a) to Japanese Patent Application No. 2018-044805, filed on Mar. 12, 2018, in the Japan Patent Office, the entire disclosure of which is hereby incorporated by reference herein.

REFERENCE SINGS LIST

1 Light emitter (optical device)
2 Light receiver
3 Controller and signal processor
11 Laser beam source
11A VCSEL array
111 Layer (laser element group)
112 Light emitting element (surface-emitting laser element)
12 First optical element
12A MLA (optical element array)
12B Diffraction element array (optical element array)
121 Lens element (optical element)
13 Second optical element
14 Movable mirror
100 LiDAR device (range sensor)
501 Vehicle (mobile object)

The invention claimed is:
1. An optical device comprising:
a light source provided with a plurality of surface-emitting laser elements configured to emit a laser beam;

a scanner configured to scan the laser beam emitted from the light source; and an optical system disposed in an optical path between the light source and the scanner and configured to guide the laser beam to the scanner, the optical system including a first optical element configured to reduce a divergence angle of the laser beam emitted from the light source, and a second optical element configured to concentrate the laser beam that has passed through the first optical element onto a to-be-scanned surface of the scanner, wherein the scanner is located at a beam waist position that corresponds a focal point of the second optical element.

2. The optical device according to claim 1, wherein the first optical element is an optical element array including a plurality of optical elements that correspond to the plurality of surface-emitting laser elements.

3. The optical device according to claim 2, wherein the optical element array is a microlens array including a plurality of microlenses or a diffraction element array including a plurality of diffraction lenses.

4. The optical device according to claim 2, wherein the light source is a surface-emitting laser array in which the plurality of surface-emitting laser elements are on a same plane, and wherein a distance between the surface-emitting laser array and the optical element array is equal to or shorter than focal length of the optical element array.

5. The optical device according to claim 1, wherein the first optical element is a lens element array of a plano-convex type in which a plurality of lens elements of a convex shape are formed on one side, and wherein the lens element array has a convex surface and the light source faces the convex surface of the lens element array.

6. The optical device according to claim 1, wherein the first optical element is a lens element array of a plano-convex type in which a plurality of lens elements of a convex shape are formed on one side, and wherein the lens element array has a flat side and the light source faces the flat side of the lens element array.

7. The optical device according to claim 1, wherein the first optical element is a lens element array of a double-convex type in which a plurality of lens elements of a convex shape are formed on both sides of the lens element array.

8. The optical device according to claim 1, wherein the light source is a surface-emitting laser array including at least one laser element group composed of the plurality of surface-emitting laser elements, wherein light emission of the at least one laser element group is controlled in an independent manner from each other, and wherein the plurality of surface-emitting laser elements included in the laser element group emit light at a same time.

9. The optical device according to claim 8, wherein the at least one laser element group of the light source is one laser element group, and wherein the scanner is a movable mirror configured to scan the laser beam on a single axis.

10. The optical device according to claim 8, wherein the at least one laser element group of the light source includes two or more laser element groups, and wherein the scanner is a movable mirror configured to biaxially scan the laser beam.

11. The optical device according to claim 8, wherein the at least one laser element group of the light source includes two or more laser element groups, and wherein the scanner is a movable mirror configured to uniaxially scan the laser beam emitted from each of the two or more laser element groups.

12. The optical device according to claim 8, wherein the at least one laser element group of the light source includes two or more laser element groups, and wherein the scanner is a movable mirror configured to biaxially scan the laser beam emitted from each of the two or more laser element groups.

13. A distance-measuring apparatus comprising the optical device according to claim 1, wherein the optical device is used to measure a distance to an object.

14. A mobile object comprising the distance-measuring apparatus according to claim 13.

15. The optical device according to claim 1, wherein the first optical element is configured to prevent a divergence of the laser beam emitted from the light source.

16. The optical device according to claim 1, wherein the second optical element is configured to set a divergence angle and an angular resolution of the laser beam to concentrate the laser beam onto the to-be-scanned surface of the scanner.

17. The optical device according to claim 10, wherein the two or more laser element groups of the light are disposed at intervals in a direction orthogonal to an optical axis of the laser beam emitted from the light source.

18. The optical device according to claim 17, wherein the scanner is configured to scan the laser beam biaxially and scan two or more areas divided according to the two or more laser element groups disposed at intervals.

19. The optical device according to claim 1, wherein a focal length of the first optical element is longer than a distance between the light source and the first optical element.

* * * * *